US010409606B2

(12) United States Patent
Burger et al.

(10) Patent No.: US 10,409,606 B2
(45) Date of Patent: Sep. 10, 2019

(54) VERIFYING BRANCH TARGETS

(71) Applicant: Microsoft Technology Licensing, LLC, Redmond, WA (US)

(72) Inventors: Douglas C. Burger, Bellevue, WA (US); Aaron L. Smith, Seattle, WA (US); Jan S. Gray, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/752,356

(22) Filed: Jun. 26, 2015

(65) Prior Publication Data

US 2016/0378499 A1 Dec. 29, 2016

(51) Int. Cl.
  *G06F 9/30* (2018.01)
  *G06F 9/38* (2018.01)
  *G06F 9/32* (2018.01)

(52) U.S. Cl.
  CPC ............ *G06F 9/3806* (2013.01); *G06F 9/322* (2013.01); *G06F 9/3832* (2013.01); *G06F 9/3859* (2013.01); *G06F 9/3861* (2013.01)

(58) Field of Classification Search
  None
  See application file for complete search history.

(56) References Cited

U.S. PATENT DOCUMENTS

| | | | |
|---|---|---|---|
| 677,105 A | 6/1901 | Shaffer | |
| 802,073 A | 10/1905 | Coldiron | |
| 851,043 A | 4/1907 | Trossin | |
| 877,059 A | 1/1908 | Dick | |
| 909,941 A | 1/1909 | Roscoe | |
| 957,435 A | 5/1909 | Morrison | |
| 993,640 A | 5/1911 | Barnard | |
| 5,142,631 A | 8/1992 | Murray et al. | |
| 5,333,280 A | 7/1994 | Ishikawa et al. | |
| 5,333,283 A | 7/1994 | Emma et al. | |
| 5,363,495 A | 11/1994 | Fry et al. | |
| 5,615,350 A | 3/1997 | Hesson | |
| 5,790,822 A | 8/1998 | Sheaffer et al. | |
| 5,796,997 A | 8/1998 | Lesartre et al. | |

(Continued)

FOREIGN PATENT DOCUMENTS

CL 2017003263 A1 6/2018
CL 2017003264 A1 6/2018

(Continued)

OTHER PUBLICATIONS

Coons et al., "A Spacial Path Scheduling Algorithm for EDGE Architectures," Oct. 20, 2006, p. 129.

(Continued)

*Primary Examiner* — William B Partridge
(74) *Attorney, Agent, or Firm* — Klarquist Sparkman, LLP

(57) ABSTRACT

Apparatus and methods are disclosed for implementing bad jump detection in block-based processor architectures. In one example of the disclosed technology, a block-based processor includes one or more block-based processing cores configured to fetch and execute atomic blocks of instructions and a control unit configured to, based at least in part on receiving a branch signal indicating a target location is received from one of the instruction blocks, verify that the target location is a valid branch target.

22 Claims, 12 Drawing Sheets

(56) References Cited

U.S. PATENT DOCUMENTS

| | | | |
|---|---|---|---|
| 5,799,167 A | 8/1998 | Lesartre | |
| 5,845,102 A | 12/1998 | Miller et al. | |
| 5,845,103 A | 12/1998 | Sodani et al. | |
| 5,903,750 A | 5/1999 | Yeh et al. | |
| 5,933,642 A | 8/1999 | Greenbaum et al. | |
| 5,943,501 A | 8/1999 | Burger et al. | |
| 5,983,337 A | 11/1999 | Mahalingaiah et al. | |
| 5,999,737 A | 12/1999 | Srivastava | |
| 6,016,399 A | 1/2000 | Chang | |
| 6,044,222 A | 3/2000 | Simons et al. | |
| 6,058,438 A | 5/2000 | Diehl et al. | |
| 6,061,776 A | 5/2000 | Burger et al. | |
| 6,112,019 A | 8/2000 | Chamdani et al. | |
| 6,161,170 A | 12/2000 | Burger et al. | |
| 6,164,841 A | 12/2000 | Mattson et al. | |
| 6,167,491 A | 12/2000 | McAlpine | |
| 6,185,675 B1 | 2/2001 | Kranich et al. | |
| 6,212,622 B1 | 4/2001 | Witt | |
| 6,275,919 B1 | 8/2001 | Johnson | |
| 6,279,101 B1 | 8/2001 | Witt et al. | |
| 6,286,135 B1 | 9/2001 | Santhanam | |
| 6,301,673 B1 | 10/2001 | Foster et al. | |
| 6,360,309 B1 | 3/2002 | Iadonato et al. | |
| 6,453,344 B1 | 9/2002 | Ellsworth et al. | |
| 6,493,820 B2 | 12/2002 | Akkary et al. | |
| 6,513,109 B1 | 1/2003 | Gschwind et al. | |
| 6,523,110 B1 | 2/2003 | Bright et al. | |
| 6,529,922 B1 | 3/2003 | Hoge | |
| 6,564,940 B2 | 5/2003 | Blaustein et al. | |
| 6,732,260 B1 | 5/2004 | Wang et al. | |
| 6,779,100 B1 | 8/2004 | Keltcher et al. | |
| 6,851,043 B1 | 2/2005 | Inoue | |
| 6,877,059 B2 | 4/2005 | Solomon et al. | |
| 6,918,032 B1 | 7/2005 | Abdallah et al. | |
| 6,934,254 B2 | 8/2005 | Brown et al. | |
| 6,934,828 B2 | 8/2005 | Parthasarathy et al. | |
| 6,957,320 B2 | 10/2005 | Senter et al. | |
| 6,957,435 B2 | 10/2005 | Armstrong et al. | |
| 6,965,969 B2 | 11/2005 | Burger et al. | |
| 6,988,183 B1 | 1/2006 | Wong | |
| 6,993,640 B2 | 1/2006 | Doing et al. | |
| 6,996,698 B2 | 2/2006 | Slegel et al. | |
| 7,032,217 B2 | 4/2006 | Wu | |
| 7,036,036 B2 | 4/2006 | Vorbach et al. | |
| 7,051,187 B2 | 5/2006 | Garg et al. | |
| 7,051,188 B1 | 5/2006 | Kubala et al. | |
| 7,152,155 B2 | 12/2006 | McIlvaine et al. | |
| 7,207,038 B2 | 4/2007 | Bicsak et al. | |
| 7,210,127 B1 | 4/2007 | Rangachari | |
| 7,228,402 B2 | 6/2007 | Rychlik et al. | |
| 7,284,100 B2 | 10/2007 | Slegel et al. | |
| 7,299,458 B2 | 11/2007 | Hammes | |
| 7,308,320 B2 | 12/2007 | Miyamori | |
| 7,310,722 B2 | 12/2007 | Moy et al. | |
| 7,380,038 B2 | 5/2008 | Gray | |
| 7,392,524 B2 | 6/2008 | Ault et al. | |
| 7,453,899 B1 | 11/2008 | Vaida et al. | |
| 7,490,224 B2 | 2/2009 | Abernathy et al. | |
| 7,526,637 B2 | 4/2009 | Jung et al. | |
| 7,571,284 B1 | 8/2009 | Olson et al. | |
| 7,587,578 B2 | 9/2009 | Isobe | |
| 7,624,254 B2 | 11/2009 | Smith et al. | |
| 7,631,170 B2 | 12/2009 | Dowling | |
| 7,664,940 B2 | 2/2010 | Conklin et al. | |
| 7,676,650 B2 | 3/2010 | Ukai | |
| 7,685,354 B1 | 3/2010 | Hetherington et al. | |
| 7,720,991 B1 | 5/2010 | Parent et al. | |
| 7,779,213 B2 | 8/2010 | Ferren et al. | |
| 7,802,073 B1 | 9/2010 | Cheng et al. | |
| 7,805,574 B2 | 9/2010 | Bell, Jr. et al. | |
| 7,853,777 B2 | 12/2010 | Jones et al. | |
| 7,873,776 B2 | 1/2011 | Hetherington et al. | |
| 7,877,580 B2 | 1/2011 | Eickemeyer et al. | |
| 7,877,586 B2 | 1/2011 | Levitan et al. | |
| 7,917,733 B2 | 3/2011 | Kazuma | |
| 7,958,396 B2 | 6/2011 | Chitsaz et al. | |
| 8,010,953 B2 | 8/2011 | Gschwind | |
| 8,032,734 B2 | 10/2011 | Svendsen et al. | |
| 8,055,881 B2 | 11/2011 | Burger et al. | |
| 8,055,885 B2 | 11/2011 | Nakashima | |
| 8,127,119 B2 | 2/2012 | Burger et al. | |
| 8,151,092 B2 | 4/2012 | Altman et al. | |
| 8,166,282 B2 | 4/2012 | Madriles et al. | |
| 8,180,997 B2 | 5/2012 | Burger et al. | |
| 8,201,024 B2 | 6/2012 | Burger et al. | |
| 8,225,315 B1 | 7/2012 | Cheng et al. | |
| 8,234,635 B2 | 7/2012 | Isshiki et al. | |
| 8,250,555 B1 | 8/2012 | Lee et al. | |
| 8,250,556 B1 | 8/2012 | Lee et al. | |
| 8,266,413 B2 | 9/2012 | Hwu et al. | |
| 8,290,994 B2 | 10/2012 | Allalouf et al. | |
| 8,321,850 B2 | 11/2012 | Bruening et al. | |
| 8,341,639 B2 | 12/2012 | Lewis | |
| 8,380,964 B2 | 2/2013 | Bishop et al. | |
| 8,433,885 B2 | 4/2013 | Burger et al. | |
| 8,434,074 B2 | 4/2013 | Janczak et al. | |
| 8,447,911 B2 | 5/2013 | Burger et al. | |
| 8,464,002 B2 | 6/2013 | Burger et al. | |
| 8,464,271 B2 | 6/2013 | Eichenberger et al. | |
| 8,473,724 B1 | 6/2013 | Kenville et al. | |
| 8,510,596 B1* | 8/2013 | Gupta | G06F 11/073 714/15 |
| 8,533,436 B2 | 9/2013 | Fryman et al. | |
| 8,555,038 B2 | 10/2013 | Olson et al. | |
| 8,589,662 B2 | 11/2013 | Altman et al. | |
| 8,589,892 B2 | 11/2013 | Fournier et al. | |
| 8,612,698 B2 | 12/2013 | Lopez et al. | |
| 8,612,726 B2 | 12/2013 | Sharawi et al. | |
| 8,677,105 B2 | 3/2014 | Abdallah | |
| 8,756,605 B2 | 6/2014 | Aingaran et al. | |
| 8,817,793 B2 | 8/2014 | Mushano | |
| 8,909,941 B1 | 12/2014 | Trimberger | |
| 8,930,678 B2 | 1/2015 | Madduri et al. | |
| 9,021,241 B2 | 4/2015 | Burger et al. | |
| 9,043,769 B2 | 5/2015 | Vorbach | |
| 9,053,292 B2 | 6/2015 | Abdallah | |
| 9,720,693 B2 | 8/2017 | Burger et al. | |
| 9,830,152 B2 | 11/2017 | Kothinti Naresh et al. | |
| 9,940,136 B2 | 4/2018 | Burger et al. | |
| 9,946,548 B2 | 4/2018 | Burger et al. | |
| 9,952,867 B2 | 4/2018 | Burger et al. | |
| 2001/0042173 A1 | 11/2001 | Bala et al. | |
| 2003/0004683 A1 | 1/2003 | Nemawarkar | |
| 2003/0012225 A1 | 1/2003 | Banerjee et al. | |
| 2003/0065835 A1 | 4/2003 | Maergner et al. | |
| 2003/0101208 A1 | 5/2003 | Chauvel et al. | |
| 2003/0149862 A1 | 8/2003 | Kadambi | |
| 2004/0123078 A1 | 6/2004 | Hum et al. | |
| 2004/0139299 A1 | 7/2004 | Busaba et al. | |
| 2005/0076194 A1 | 4/2005 | Kanapathippillai et al. | |
| 2006/0020769 A1 | 1/2006 | Herrell et al. | |
| 2006/0020944 A1 | 1/2006 | King et al. | |
| 2006/0031702 A1 | 2/2006 | Jardine et al. | |
| 2006/0041875 A1 | 2/2006 | Peri et al. | |
| 2006/0075207 A1 | 4/2006 | Togawa et al. | |
| 2006/0136915 A1 | 6/2006 | Aingaran et al. | |
| 2006/0179196 A1 | 8/2006 | Gray | |
| 2006/0242391 A1 | 10/2006 | Elwood | |
| 2006/0259739 A1 | 11/2006 | Asal et al. | |
| 2006/0259740 A1 | 11/2006 | Hahn et al. | |
| 2006/0282624 A1 | 12/2006 | Yokota | |
| 2007/0050557 A1 | 3/2007 | Ferren et al. | |
| 2007/0055827 A1 | 3/2007 | Tsien | |
| 2007/0074011 A1 | 3/2007 | Borkar et al. | |
| 2007/0113171 A1 | 5/2007 | Behrens et al. | |
| 2007/0157006 A1 | 7/2007 | Jourdan et al. | |
| 2007/0162906 A1 | 7/2007 | Chandhoke | |
| 2007/0192540 A1 | 8/2007 | Gara et al. | |
| 2007/0239965 A1 | 10/2007 | Lewites et al. | |
| 2007/0255980 A1* | 11/2007 | Endo | G06F 11/28 714/51 |
| 2008/0046621 A1 | 2/2008 | Okino et al. | |
| 2008/0109668 A1 | 5/2008 | Atkinson | |
| 2008/0126750 A1 | 5/2008 | Sistla | |

(56) References Cited

U.S. PATENT DOCUMENTS

| | | |
|---|---|---|
| 2008/0192050 A1 | 8/2008 | Schardt et al. |
| 2008/0235493 A1 | 9/2008 | Fortier |
| 2008/0235499 A1 | 9/2008 | Togawa |
| 2008/0244506 A1 | 10/2008 | Killian et al. |
| 2008/0250227 A1 | 10/2008 | Linderman et al. |
| 2009/0013135 A1 | 1/2009 | Burger et al. |
| 2009/0013153 A1 | 1/2009 | Hilton |
| 2009/0013160 A1 | 1/2009 | Burger et al. |
| 2009/0138681 A1 | 5/2009 | Saha |
| 2009/0150657 A1 | 6/2009 | Gschwind et al. |
| 2009/0172365 A1 | 7/2009 | Orenstien et al. |
| 2009/0177843 A1 | 7/2009 | Wallach et al. |
| 2009/0187739 A1 | 7/2009 | Nemirovsky et al. |
| 2009/0299966 A1 | 12/2009 | Schneider |
| 2010/0070958 A1 | 3/2010 | Takagi |
| 2010/0082947 A1 | 4/2010 | Tramm et al. |
| 2010/0146209 A1 | 6/2010 | Burger et al. |
| 2010/0262807 A1 | 10/2010 | Burky et al. |
| 2010/0325395 A1 | 12/2010 | Burger et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0219222 A1 | 9/2011 | Eichenberger et al. |
| 2011/0238953 A1 | 9/2011 | Metsugi et al. |
| 2011/0252258 A1 | 10/2011 | Im et al. |
| 2012/0017069 A1 | 1/2012 | Bourd et al. |
| 2012/0030451 A1 | 2/2012 | Pong et al. |
| 2012/0079102 A1 | 3/2012 | Damodaran et al. |
| 2012/0079488 A1 | 3/2012 | Phillips et al. |
| 2012/0124345 A1 | 5/2012 | Denman et al. |
| 2012/0131309 A1 | 5/2012 | Johnson et al. |
| 2012/0216012 A1 | 8/2012 | Vorbach et al. |
| 2012/0246448 A1 | 9/2012 | Abdallah |
| 2012/0246450 A1 | 9/2012 | Abdallah |
| 2012/0204004 A1 | 10/2012 | Chen |
| 2012/0303933 A1 | 11/2012 | Manet et al. |
| 2012/0311306 A1 | 12/2012 | Mushano |
| 2013/0024676 A1* | 1/2013 | Glew ................ G06F 9/30076 712/244 |
| 2013/0046954 A1 | 2/2013 | Ruehle et al. |
| 2013/0086370 A1 | 4/2013 | Burger et al. |
| 2013/0191817 A1 | 7/2013 | Vorbach |
| 2013/0198499 A1 | 8/2013 | Dice et al. |
| 2013/0246682 A1 | 9/2013 | Jandhyam |
| 2013/0339470 A1 | 12/2013 | Jeswani et al. |
| 2014/0033217 A1 | 1/2014 | Vajda et al. |
| 2014/0075144 A1 | 3/2014 | Sanders et al. |
| 2014/0082327 A1* | 3/2014 | Ghose ................ G06F 9/3877 712/205 |
| 2014/0095837 A1 | 4/2014 | Plotnikov et al. |
| 2014/0136822 A1 | 5/2014 | Suggs et al. |
| 2014/0173222 A1 | 6/2014 | Alapati et al. |
| 2014/0173262 A1 | 6/2014 | Chheda et al. |
| 2014/0181475 A1 | 6/2014 | Abdallah |
| 2014/0189287 A1 | 7/2014 | Plotnikov |
| 2014/0195787 A1 | 7/2014 | Scalabrino et al. |
| 2014/0201507 A1 | 7/2014 | Jayaseelan et al. |
| 2014/0281389 A1 | 9/2014 | Loktyukhin et al. |
| 2014/0281402 A1 | 9/2014 | Comparan et al. |
| 2014/0281416 A1 | 9/2014 | Abdallah |
| 2014/0281424 A1 | 9/2014 | Bobba et al. |
| 2014/0281434 A1 | 9/2014 | Madriles et al. |
| 2014/0281622 A1 | 9/2014 | Wagh et al. |
| 2014/0282607 A1 | 9/2014 | O'sullivan et al. |
| 2014/0298336 A1 | 10/2014 | Taniuchi |
| 2014/0317387 A1 | 10/2014 | Abdallah |
| 2014/0331236 A1 | 11/2014 | Mitra et al. |
| 2014/0351524 A1 | 11/2014 | Natarajan et al. |
| 2014/0372736 A1 | 12/2014 | Greenhalgh |
| 2014/0373022 A1 | 12/2014 | Chan |
| 2015/0019921 A1 | 1/2015 | Chen et al. |
| 2015/0067214 A1 | 3/2015 | Henry et al. |
| 2015/0067662 A1 | 3/2015 | Palalau |
| 2015/0074355 A1 | 3/2015 | Sampathkumar et al. |
| 2015/0095628 A1* | 4/2015 | Yamada ................ G06F 21/54 712/234 |
| 2015/0100757 A1 | 4/2015 | Burger et al. |
| 2015/0127928 A1 | 5/2015 | Burger et al. |
| 2015/0199199 A1 | 7/2015 | Burger et al. |
| 2015/0199272 A1 | 7/2015 | Goel et al. |
| 2016/0055004 A1 | 2/2016 | Grochowski et al. |
| 2016/0179546 A1* | 6/2016 | Yamada ................ G06F 21/54 712/240 |
| 2016/0328237 A1 | 11/2016 | Di et al. |
| 2016/0378479 A1 | 12/2016 | Burger et al. |
| 2016/0378483 A1 | 12/2016 | Burger et al. |
| 2016/0378484 A1 | 12/2016 | Burger et al. |
| 2016/0378488 A1 | 12/2016 | Burger et al. |
| 2016/0378491 A1 | 12/2016 | Burger et al. |
| 2016/0378493 A1 | 12/2016 | Burger et al. |
| 2016/0378496 A1 | 12/2016 | Gray et al. |
| 2016/0378502 A1 | 12/2016 | Burger et al. |
| 2016/0378661 A1 | 12/2016 | Gray et al. |
| 2017/0083340 A1 | 3/2017 | Burger et al. |
| 2017/0083343 A1 | 3/2017 | Burger et al. |
| 2017/0277536 A1 | 9/2017 | Kothinti naresh et al. |

FOREIGN PATENT DOCUMENTS

| | | |
|---|---|---|
| CN | 2306094 Y | 2/1999 |
| CN | 101344843 | 1/2009 |
| CN | 102096579 A | 6/2011 |
| CN | 102306094 | 1/2012 |
| CN | 104310225 A | 1/2015 |
| EP | 0583089 A2 | 2/1994 |
| EP | 0 992 894 A1 | 4/2000 |
| EP | 1 039 374 A2 | 9/2000 |
| EP | 1102163 A2 | 5/2001 |
| EP | 2527972 A2 | 11/2012 |
| WO | 0125903 A1 | 4/2001 |
| WO | WO 2004/001587 | 12/2003 |
| WO | 2006102664 A2 | 9/2006 |
| WO | WO 2009/006607 | 1/2009 |
| WO | WO 2011/031361 | 3/2011 |
| WO | 2013095635 A1 | 6/2013 |
| WO | WO 2013/081556 | 6/2013 |
| WO | WO 2013/095401 | 6/2013 |
| WO | 2014014216 A1 | 1/2014 |
| WO | WO 2014/193878 | 12/2014 |
| WO | 2015069583 A1 | 5/2015 |
| WO | 2016210026 A1 | 12/2016 |
| WO | 2016210031 A1 | 12/2016 |

OTHER PUBLICATIONS

International Search Report and Written Opinion for PCT/US2016/038848, dated Oct. 5, 2016, 11 pages.

Robatmili et al., "Strategies for Mapping Dataflow Blocks to Disributed Hardware," In 41st IEEE/ACM International Symposium on IEEE, Nov. 8, 2008, pp. 23-34.

Burger et al., "Scaling to the End of Silicon with EDGE Architectures," In Proceedings of Computer, vol. 37, Issue 7, Jul. 1, 2004, pp. 44-55.

Gray and Smith, "Towards an Area-Efficient Implementation of a High ILP EDGE Soft Processor: Comparing Out-of-Order Dataflow Instruction Scheduler Designs," poster temporarily on display during The 22nd IEEE International Symposium on Field-Programmable Custom Computing Machines, May 11-13, 2014, Boston, Massachusetts (poster on display for approximately 1-2 hours, and less than one day, May 2014).

Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).

August, et al., "Architectural Support for Compiler-Synthesized Dynamic Branch Prediction Strategies: Rationale and Initial Results", In Proceedings of Third International Symposium on High-Performance Computer Architecture, Feb. 1, 1997, pp. 84-93.

(56) References Cited

OTHER PUBLICATIONS

Burger et al., "Design and Implementation of the TRIPS EDGE Architecture", In Proceedings of the 32nd Annual International Symposium on Computer Architecture, Jun. 4, 2005, pp. 1-41.
Bush et al., "Evaluation and Optimization of Signal Processing Kernels on the TRIPS Architecture", In Proceedings of 4th Annual Workshop on Optimizations for DSP and Embedded Systems, Mar. 2006, pp. 1-10.
Chiu et al., "Hyperscalar: A Novel Dynamically Reconfigurable Multi-core Architecture", In Proceedings of 39th International Conference on Parallel Processing, Sep. 13, 2010, pp. 277-286.
Fallin, et al., "The Heterogeneous Block Architecture", In Proceedings of 32nd IEEE International Conference on Computer Design, Oct. 19, 2014, pp. 1-8.
Gaudiot, et al., "The Sisal Model of Functional Programming and its Implementation", In Proceedings of Second Aizu International Symposium on Parallel Algorithms/Architectures Synthesis, Mar. 17, 1997, pp. 1-12.
Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Kavi, et al., "Concurrency, Synchronization, Speculation—the Dataflow Way", In Journal of Advances in Computers, vol. 96, Nov. 23, 2013, pp. 1-41.
Munshi, et al., "A Parameterizable SIMD Stream Processor", In Proceedings of Canadian Conference on Electrical and Computer Engineering, May 1, 2005, pp. 806-811.
Nagarajan et al., "A Design Space Evaluation of Grid Processor Architectures," In Proceedings of the 34th annual ACM/IEEE international symposium on Microarchitecture, Dec. 1, 2001, pp. 40-51.
Pengfei et al., "M5 Based EDGE Architecture Modeling", In Proceedings of IEEE International Conference on Computer Design, Oct. 3, 2010, pp. 289-296.
Pierce et al., "Wrong-Path Instruction Prefetching", In Proceedings of the 29th Annual IEEE/ACM International Symposium on Microarchitecture, Dec. 2, 1996, pp. 1-17.
Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Souza et al., "Dynamically Scheduling VLIW Instructions", In Journal of Parallel and Distributed Computing, vol. 60, Jul. 2000, pp. 1480-1511.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
Coons et al., "A Spatial Path Scheduling Algorithm for EDGE Architectures," ASPLOS '06, San Jose, CA, Oct. 21, 2006, pp. 1-12.
Desikan et al., "Scalable Selective Re-Execution for EDGE Architectures," in Proceedings of the 11th International Conference on Architectural Support for Programming Languages and Operating Systems, Oct. 9, 2004, pp. 1-13.
Duong, et al., "Compiler-Assisted, Selective Out-of-Order Commit", In Journal of IEEE Computer Architecture Letters, vol. 12, Issue 1, Jan. 2013, pp. 1-3.
Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, pp. 1-8.
Duric et al., "EVX: Vector Execution on Low Power EDGE Cores," Design, Automation and Test in European Conference and Exhibition, Mar. 24-28, 2014, pp. 1-4.
Duric et al., "ReCompAc: Reconfigurable compute accelerator," IEEE 2013 International Conference on Reconfigurable Computing and FPGAS (Reconfig), Dec. 9, 2013, pp. 1-4.
"Explicit Data Graph Execution", Retrieved on: Aug. 6, 2015, Available at: https://en.wikipedia.org/wiki/Explicit_Data_Graph_Execution, pp. 1-5.
Gebhart et al., "An Evaluation of the TRIPS Computer System," In Proceedings of the 14th international conference on Architectural support for programming languages and operating systems, Mar. 7, 2009, pp. 1-12.
González, et al., "Dependence Speculative Multithreaded Architecture", In Technical Report, Retrieved on: Jul. 1, 2015, pp. 1-22.
Govindan, "E3:Energy-Efficient EDGE Architectures", In Dissertation, Aug. 2010, pp. 1-244, including pp. 1-12 and 89-124.
Govindan et al., "Scaling Power and Performance via Processor Composability," IEEE Transaction on Computers, No. 1, Aug. 2014, pp. 1-14.
Govindaraju et al., "DySER: Unifying Functionality and Parallelism Specialization for Energy-Efficient Computing," IEEE Micro, IEEE Service Center, Sep. 1, 2012, pp. 1-14.
Gulati et al., "Multitasking Workload Scheduling on Flexible Core Chip Multiprocessors," In Proceedings of the Computer Architecture News, vol. 36, Issue 2, May 2008, pp. 1-10.
Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, pp. 1-14.
Huang, "Improving Processor Performance Through Compiler-Assisted Block Reuse," In Doctoral Dissertation, May 2000, pp. 1-125, including pp. 4-8, 18-53, and 71-86.
Ipek et al., "Core Fusion: Accommodating Software Diversity in Chip Multiprocessors", In Proceedings of the 34th annual international symposium on Computer architecture, Jun. 9, 2007, pp. 1-12.
Keckler et al., "Tera-Op Reliable Intelligently Adaptive Processing System (Trips)," In AFRL-IF-WP-TR-2004-1514, document dated Apr. 2004, pp. 1-29.
Kozumplik, et al., "TRIPS to the Semantic EDGE", Retrieved on: Sep. 22, 2015, Available at: http://vbn.aau.dk/ws/files/61072300/1212050422.pdf, pp. 1-28.
Li et al., "Code Layout Optimization for Defensiveness and Politeness in Shared Cache," 11, (also published as Li, et al, "Code Layout Optimization for Defensiveness and Politeness in Shared Cache" 43rd International Conference on Parallel Processing (ICPP), IEEE, pp. 151-161 (Oct. 18, 2014)).
Liu, "Hardware Techniques to Improve Cache Efficiency", In Dissertation of the University of Texas at Austin, May 2009, pp. 1-189, including pp. 105-139.
Maher, "Atomic Block Formation for Explicit Data Graph Execution Architectures", In Dissertation of Doctor of Philosophy, Aug. 2010, pp. 1-185, including pp. 11-33 and 63-120.
Maher et al., "Merging Head and Tail Duplication for Convergent Hyperblock Formation," In Annual IEEE/ACM International Symposium on Microarchitecture, Dec. 2006, pp. 1-12.
McDonald et al., "TRIPS Processor Reference Manual," In Technical Report TR-05-19, document marked Mar. 10, 2005, pp. 1-194, including pp. 7-50 and 190-194.
Melvin et al., "Enhancing Instruction Scheduling with a Block-Structured ISA," International Journal of Parallel Programming, vol. 23, No. 3, Jun. 1995, pp. 1-23.
Microsoft Research, "E2," document downloaded on Apr. 10, 2015 from http://research.microsoft.com/en-us/projects/e2/, pp. 1-2.
Nagarajan et al., "Critical Path Analysis of the TRIPS Architecture," In IEEE International Symposium on Performance Analysis of Systems and Software, Mar. 19, 2006, pp. 1-11.
Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, pp. 1-11.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, pp. 1-11.

(56) References Cited

OTHER PUBLICATIONS

Pickett, "Software Method Level Speculation for Java", In Thesis, Apr. 2012, pp. 1-236, including pp. 112-184.
Pricopi et al., "Bahurupi: A Polymorphic Heterogeneous Multi-Core Architecture," ACM Trans. Architec. Code Optim. 8, 4, Article 22 (Jan. 2012), pp. 1-21.
Robatmili et al., "Exploiting Criticality to Reduce Bottlenecks in Distributed Uniprocessors," 17th IEEE International Symposium on High-Performance Computer Architecture (HPCA-17), Feb. 2011, pp. 1-12.
Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, pp. 1-12.
Roesner, "Counting Dependence Predictors," In Undergraduate Honors Thesis, May 2, 2008, pp. 1-25.
Sankaralingam et al., "Exploiting ILP, TLP, and DLP with Polymorphous TRIPS Architecture," In Proceedings of the 30th Annual International Symposium on Computer Architecture, Jun. 9, 2003, pp. 1-12.
Sankaralingam, "Polymorphous Architectures: A Unified Approach for Extracting Concurrency of Different Granularities", In Doctoral Dissertation of Philosophy, Aug. 2007, pp. 1-276, including pp. 80-112.
Sethumadhavan et al., "Design and Implementation of the TRIPS Primary Memory System," In Proceedings of International Conference on Computer Design, Oct. 1, 2006, pp. 1-7.
Smith et al., "Compiling for EDGE Architectures," In Proceedings of International Symposium on Code Generation and Optimization, Mar. 26, 2006, pp. 1-11.
Smith et al., "Dataflow Predication", In Proceedings of 39th Annual IEEE/ACM International Symposium on Microarchitecture, Dec. 9, 2006, pp. 1-12.
Smith, "Explicit Data Graph Compilation," In Thesis, Dec. 2009, pp. 1-201, including pp. 29-62 and 115-138.
Smith, "TRIPS Application Binary Interface (ABI) Manual," Technical Report TR-05-22, Department of Computer Sciences, The University of Texas at Austin, Technical Report TR-05-22, document marked Oct. 10, 2006, pp. 1-16.
Wu et al., "Block Based Fetch Engine for Superscalar Processors", In Proceedings of the 15th International Conference on Computer Applications in Industry and Engineering, Nov. 7, 2002, pp. 1-4.
Zmily, "Block-Aware Instruction Set Architecture", In Doctoral Dissertation, Jun. 2007, pp. 1-176, including pp. 7-23, 42-56, and 61-77.
"How Many Clock Cycles does a RISCICISC Instruction Take to Execute?", Retrieved from: http://electronics.stackexchange.com/questions/170551/how-many-clock-cycles-does-a-risc-cisc-instruction-take-to-execute, Retrieved on: Jun. 13, 2017, 5 Pages.
"Load/store Architecture", Retrieved From: https://en.wikipedia.org/wiki/Load/store_architecture, Retrieved Date: Sep. 24, 2015, 1 Page.
"Loop-Invariant Code Motion with Unsafe Operations", Retrieved from: https://web.archive.org/web/20150927030042/https://cs.stackexchange.com/questions/28054/loop-invariant-code-motion-with-unsafe-operations, Retrieved on: Apr. 9, 2015, 4 Pages.
"Programmatic API for Building Resources", Retrieved From: https://web.archive.org/web/20150706082232/https://jersey.java.net/nonav/documentation/2.0/resource-builder.html, Retrieved on: Dec. 4, 2018, 3 Pages.
"TRIPS (The Tera-op, Reliable, Intelligently adaptive Processing System)", Retrieved from: http://www.cs.utexas.edu/users/cart/trips/, Retrieved on: Sep. 4, 2015, 1 Page.
"Final Office Action Issued in U.S. Appl. No. 14/252,101", dated Jan. 12, 2017, 18 Pages.
"Non-Final Office Action Issued in U.S. Appl. No. 14/252,101", dated Jul. 7, 2016, 18 Pages.
"Final Office Action Issued in U.S. Appl. No. 14/752,418", dated Jun. 5, 2018, 22 Pages.
"Non Final Office Action Issued in U.S. Appl. No. 14/752,418", dated Sep. 19, 2017, 19 Pages.
"Non Final Office Action Issued in U.S. Appl. No. 14/752,418", dated May 18, 2017, 20 Pages.
"Non-Final Office Action Issued in U.S. Appl. No. 14/752,596", dated May 10, 2017, 22 Pages.
"Final Office Action Issued in U.S. Appl. No. 14/752,636", dated Dec. 7, 2018, 18 Pages.
"Final Office Action Issued in U.S. Appl. No. 14/752,636", dated Nov. 13, 2017, 18 Pages.
"Non Final Office Action Issued in U.S. Appl. No. 14/752,636", dated Aug. 2, 2018, 17 Pages.
"Non Final Office Action Issued in U.S. Appl. No. 14/752,636", dated Apr. 14, 2017, 15 Pages.
"Final Office Action Issued in U.S. Appl. No. 14/752,660", dated Oct. 19, 2017, 23 Pages.
"Non Final Office Action Issued in U.S. Appl. No. 14/752,660", dated Apr. 6, 2017, 22 Pages.
"Non-Final Office Action Issued in U.S. Appl. No. 14/752,660", dated Oct. 18, 2018, 20 Pages.
"Final Office Action Issued in U.S. Appl. No. 14/942,461", dated Aug. 28, 2018, 12 Pages.
"Non Final Office Action Issued in U.S. Appl. No. 14/942,461", dated Mar. 12, 2018, 15 Pages.
Aasaraai, et al., "Design Space Exploration of Instruction Schedulers for Out-of Order Soft Processors", In Proceedings of the International Conference on Field Programmable Technology, Dec. 8, 2010, 4 Pages.
Abraham, et al., "Predictability of Load/Store Instruction Latencies", In Proceedings of the 26th Annual International Symposium on Microarchitecture, Dec. 1, 1993, pp. 139-152.
Benson, et al., "Design, Integration and Implementation of the DySER Hardware Accelerator", In Proceedings of 18th International Symposium on High Performance Computer Architecture, Feb. 25, 2012, 12 Pages.
Budiu, et al., "Optimizing Memory Accesses for Spatial Computation", In Proceedings of 1st International Symposium on Code Generation and Optimization, Mar. 23, 2003, 13 Pages.
Bush, Jeff, "Microarchitecture", Retrieved from: https://github.com/jbush001/NyuziProcessor/wiki/Microarchitecture, Retrieved on: Jun. 13, 2017, 7 Pages.
Cain, et al., "Memory Ordering: A Value-Based Approach", In Journal of IEEE Computer Society, vol. 24, Issue 1, Nov. 2004, pp. 110-117.
Chang, et al., "Cooperative Caching for Chip Multiprocessors", In Proceedings of the 33rd Annual International Symposium on Computer Architecture, Jun. 17, 2006, 12 Pages.
Cheah, et al., "Analysis and Optimization of a Deeply Pipelined FPGA Soft Processor", In Proceedings of International Conference on Field-Programmable Technology, Dec. 10, 2014, 4 Pages.
Chrysos, et al., "Memory Dependence Prediction using Store Sets", In Proceedings of the 25th Annual International Symposium on Computer Architecture, vol. 26, Issue 3, Jun. 1998, 12 Pages.
Coons, et al., "Feature Selection for Instruction Placement in an EDGE Architecture", Retrieved From: https://pdfs.semanticscholar.org/4c38/8fbe53827627c21a9d2a650395ed4470e544.pdf, Mar. 17, 2007, 6 Pages.
Cooper, et al., "Loop Invariant Code Motion—Classical Approaches", Retrieved from: http://booksite.elsevier.com/9780120884780/Graduate_Lecture_Slides/Optimizations/23CM-Classic.ppt, Retrieved Date: Apr. 8, 2015, 19 Pages.
Essen, et al., "Energy-Efficient Specialization of Functional Units in a Coarse-Grained Reconfigurable Array", In Proceedings of the 19th ACM/SIGDA International Symposium on Field Programmable Gate Arrays, Feb. 27, 2011, 4 Pages.
Govindan, et al., "TRIPS: A Distributed Explicit Data Graph Execution (EDGE) Microprocessor", In Proceedings of IEEE Symposium on Hot Chips, Aug. 19, 2007, 13 Pages.
Gupta, et al., "Erasing Core Boundaries for Robust and Configurable Performance", In Proceedings of 43rd Annual IEEE/ACM International Symposium on Microarchitecture, Dec. 4, 2010, 12 Pages.

(56) References Cited

OTHER PUBLICATIONS

Hayes, et al., "Unified On-chip Memory Allocation for SIMT Architecture", In Proceedings of the 28th ACM International Conference on Supercomputing, Jun. 10, 2014, pp. 293-302.
Hruska, Joel, "VISC CPU Virtual Core Design Emerges: Could this be the conceptual computing breakthrough we've been waiting for?", Retrieved From: https://www.extremetech.com/extreme/192858-visc-cpu-virtual-core-design-emerges-could-this-be-the-conceptual-breakthrough-weve-been-waiting-for, Oct. 24, 2014, 9 Pages.
Jhala, et al., "Compiler Construction", In Proceedings of 22nd International Conferences on Theory and Practice of Software, Mar. 16, 2013, 11 Pages.
Jones, et al., "A Comparison of Data Prefetching on an Access Decoupled and Superscalar Machine", In IEEE 30th Annual International Symposium on Microarchitecture, Dec. 3, 1997, 6 Pages.
Junier, et al., "Impact of Instruction Cache Replacement Policy on the Tightness of WCET Estimation", In Proceedings of the 2nd Junior Researcher Workshop on Real-Time Computing, in Conjunction to RTNS, Oct. 16, 2008, 4 Pages.
Kamaraj, et al., "Design of Out-Of-Order Superscalar Processor with Speculative Thread Level Parallelism", In Proceedings of International Conference on Innovations in Engineering and Technology, Mar. 21, 2014, pp. 1473-1478.
Kinsy, et al., "Heracles: A Tool for Fast RTL-Based Design Space Exploration of Multicore Processors", In Proceedings of the ACM/SIGDA International Symposium on Field Programmable Gate Arrays, Feb. 11, 2013, 11 Pages.
Xue, et al., "Partial Dead Code Elimination on Predicated Code Regions", In Journal of Software—Practice & Experience, vol. 36, Issue 15, Jan. 2004, 32 Pages.
Kocabas, et al., "Enhancing an Embedded Processor Core with a Cryptographic Unit for Performance and Security", In Proceedings of the 4th International Conference on Reconfigurable Computing and FPGAs, Dec. 3, 2008, pp. 409-414.
Li, et al., "Compiler-Assisted Hybrid Operand Communication", In Technical Report TR-09-33, Nov. 1, 2009, 12 Pages.
Maher, et al., "The Good Block: Hardware/Software Design for Composable, Block-Atomic Processors", In Proceedings of 15th Workshop on Interaction between Compilers and Computer Architectures, Feb. 12, 2011, 8 Pages.
Muraoka, et al., "VCore-based Design Methodology", In Proceedings of the Asia and South Pacific Design Automation Conference, Jan. 21, 2003, 5 Pages.
"Office Action Issued in Colombian Patent Application No. NC2017/0013251", dated Jul. 4, 2018, 14 Pages. (W/O English Translation).
"Office Action Issued in Colombian Patent Application No. NC2017/0013252", dated Jul. 5, 2018, 13 Pages. (W/O English Translation).
"Office Action Issued in Colombian Patent Application No. NC2017/0013277", dated Jul. 9, 2018, 13 Pages. (W/O English Translation).
Nethercote, et al., "Self-Evaluating Compilation Applied to Loop Unrolling", In Technical Report, TR-06, Feb. 2006, 17 Pages.
Park, et al., "Reducing Design Complexity of the Load/Store Queue", In Proceedings of the 36th Annual IEEE/ ACM International Symposium on Microarchitecture, Dec. 3, 2003, 12 Pages.
"International Preliminary Report on Patentability Issued in PCT Application No. PCT/US2014/039654", dated Aug. 17, 2015, 11 Pages.
"International Search Report & Written Opinion for PCT Application No. PCT/US2014/039654", dated Aug. 26, 2014, 13 Pages.
"Second Written Opinion Issued in PCT Application No. PCT/US2014/039654", dated Mar. 3, 2015, 7 Pages.
"International Search Report and Written Opinion Issued in PCT Application No. PCT/US2016/038845", dated Sep. 30, 2016, 14 Pages.
"International Search Report and Written Opinion Issued in PCT Application No. PCT/US2016/038849", dated Sep. 30, 2016, 14 Pages.
"International Search Report and Written Opinion Issued in PCT Application No. PCT/US2016/038850", dated Sep. 22, 2016, 12 Pages.
"International Search Report and Written Opinion Issued in PCT Application No. PCT/US2016/038851", dated Sep. 27, 2016, 11 Pages.
"International Preliminary Report on Patentability Issued in PCT Application No. PCT/US2016/038852", dated Sep. 13, 2017, 9 Pages.
"International Search Report and Written Opinion Issued in PCT Application No. PCT/US2016/038852", dated Sep. 23, 2016, 14 Pages.
"Second Written Opinion Issued in PCT Application No. PCT/US2016/038852", dated May 24, 2017, 5 Pages.
"International Preliminary Report on Patentability Issued in PCT Application No. PCT/US2016/038853", dated Sep. 18, 2017, 7 Pages.
"International Search Report and Written Opinion Issued in PCT Application No. PCT/US2016/038853", dated Sep. 22, 2016, 15 Pages.
"Second Written Opinion Issued in PCT Application No. PCT/US2016/038853", dated May 24, 2017, 6 Pages.
"International Preliminary Report on Patentability Issued in PCT Application No. PCT/US2016/038854", dated Jun. 6, 2017, 8 Pages.
"International Search Report and Written Opinion Issued in PCT Application No. PCT/US2016/038854", dated Sep. 22, 2016, 13 Pages.
"International Preliminary Report on Patentability Issued in PCT Application No. PCT/US2016/038855", dated Sep. 27, 2017, 8 Pages.
"International Search Report and Written Opinion Issued in PCT Application No. PCT/US2016/038855", dated Sep. 27, 2016, 13 Pages.
"Second Written Opinion Issued in PCT Application No. PCT/US2016/038855", dated May 18, 2017, 8 Pages.
"International Preliminary Report on Patentability Issued in PCT Application No. PCT/US2016/051208", dated Nov. 17, 2017, 9 Pages.
"International Search Report & Written Opinion Issued in PCT Application No. PCT/US2016/051208", dated Feb. 3, 2017, 18 Pages.
"Second Written Opinion Issued in PCT Application No. PCT/US2016/051208", dated Aug. 9, 2017, 8 Pages.
"International Search Report and Written Opinion Issued in PCT Application No. PCT/US2016/051209", dated Dec. 16, 2016, 10 Pages.
"International Search Report and Written Opinion Issued in PCT Application No. PCT/US2016/051413", dated Jan. 2, 2017, 16 Pages.
"International Search Report and Written Opinion Issued in PCT Application No. PCT/US2016/051417", dated Dec. 15, 2016, 10 Pages.
Pericas, et al., "A Decoupled KILO-Instruction Processor", In Proceedings of the Twelfth International Symposium on High-Performance Computer Architecture, Feb. 11, 2006, 12 Pages.
Pericas, et al., "A Two-Level Load/Store Queue Based on Execution Locality", In Proceedings of International Symposium on Computer Architecture, vol. 36, Issue 3, Jun. 21, 2008, 12 Pages.
Sarkar, et al., "Understanding Power Multiprocessors", In Proceedings of the 32nd ACM SIGPLAN Conference on Programming Language Design and Implementation, Jun. 4, 2011, pp. 175-186.
Sethumadhavan, et al., "Late-Binding: Enabling Unordered Load-Store Queues", In Proceedings of the 34th Annual International Symposium on Computer Architecture, Jun. 9, 2007, pp. 347-357.
Sohi, et al., "Multiscalar Processors", In Proceedings of 22nd Annual International Symposium on Computer Architecture, vol. 23, Issue 02, Jun. 22, 1995, 12 Pages.
Sohi, Gurindar, "Retrospective: Multiscalar Processors", In Proceedings of the 25th Annual International Symposium on Computer Architectures, Jun. 27, 1998, pp. 111-114.

(56) References Cited

OTHER PUBLICATIONS

Uhrig, et al., "The Two-dimensional Superscalar GAP Processor Architecture", In Proceedings of International Journal on Advances in Systems and Measurements, vol. 3, Issue 1 & 2, Jan. 2010, pp. 71-81.
Wong, et al., "Efficient Methods for Out-of-Order Load/Store Execution for High-Performance Soft Processors", In Proceedings of International Conference on Field-Programmable Technology, Dec. 9, 2013, pp. 442-445.
"Office Action Issued in Chilean Patent Application No. 201703263", dated Jan. 11, 2019, 7 Pages.
"Office Action Issued in Chilean Patent Application No. 201703264", dated Jan. 11, 2019, 7 Pages.
"Non Final Office Action Issued in U.S. Appl. No. 14/942,461", dated Jan. 18, 2019, 9 Pages.
"Office Action Issued in Colombian Patent Application No. NC2017/0013272", dated Dec. 4, 2018, 25 Pages.
Oshana, Robert, "Interrupt Management", In Book Software Engineering for Embedded Systems, Apr. 1, 2013, 4 Pages.
Appelbe et al., "Hoisting Branch Conditions—Improving Super-Scalar Processor Performance," Languages and Compilers for Parallel Computing, pp. 304-317 (Jun. 1995)).
Bouwens et al., "Architecture Enhancements for the ADRES Coarse-Grained Reconfigurable Array," Proceedings of the $3^{rd}$ International Conference on High Performance Embedded Architectures and Compilers, pp. 66-81 (Jan. 2008).
Hammond et al., "Programming with Transactional Coherence and Consistency (TCC)," ACM SIGOPS Operating Systems Review, vol. 38, No. 5, Dec. 2004, pp. 1-13.
Hammond et al., "Transactional Coherence and Consistency: Simplifying Parallel Hardware and Software," IEEE Micro, vol. 24, No. 65, pp. 92-103, Nov.-Dec. 2004.
Hammond et al., "Transactional Memory Coherence and Consistency," ACM SIGARCH Computer Architecture News, vol. 32, No. 2, Mar. 2004, pp. 102-113.
Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf, pp. 1-21 (also published as Huang & Lilja, "Compiler-Assisted Sub-Block Reuse," UMSI ResearchReport/University of Minnesota Supercomputer Institute 73 (Jun. 2000)).
Kim et al., "Composable lightweight processors," 40th Annual IEEE/ACM International Symposium on Microarchitecture (MICRO 2007), pp. 381-394, (Dec. 2007)).
McDonald et al., "Characterization of TCC on Chip-Multiprocessors," Parallel Architectures and Compilation Techniques, $14^{th}$ Annual Conference on Parallel Architectures and Compilation Techniques, Sep. 2005, pp. 1-12.
Pricopi et al., "Bahurupi: A Polymorphic Heterogeneous Multi-Core Architecture," ACM Transactions on Architecture and Code Optimization (TACO)—Special Issue on High-Performance Embedded Architectures and Compilers, vol. 8, No. 4 Article 22 (Jan. 2012), pp. 1-21.
Putnam et al., "Dynamic vectorization in the E2 dynamic multicore architecture" ACM SIGARCH Computer Architecture News, vol. 38, No. 4, pp. 27-32. (Sep. 2010)).
Sankaralingam et al., "Distributed Microarchitectural Protocols in the TRIPS Prototype Processor," Proceedings of 39th Annual IEEE/ACM International Symposium on Microarchitecture, pp. 480-491 (Dec. 2006)).
Sibi et al., "Scaling Power and Performance via Processor Composability," University of Texas at Austin technical report No. TR-10-14 (Apr. 2010), pp. 1-20.
Tamches et al., "Dynamic Kernel Code Optimization," In Workshop on Binary Translation, Sep. 2001, pp. 1-10.
"Office Action Issued in Chilean Patent Application No. 201703263", dated Apr. 15, 2019, 7 pages.
"Office Action Issued in Chilean Patent Application No. 201703318", dated Mar. 26, 2019, 9 pages.
"Non Final Office Action Issued in U.S. Appl. No. 14/752,418", dated Apr. 16, 2019, 20 pages.
"Final Office Action Issued in U.S. Appl. No. 14/752,660", dated May 22, 2019, 23 Pages.
Sankaralingam, et al., "Universal Mechanisms for Data-Parallel Architectures", In the Proceedings of the 36th International Symposium on Microarchitecture, Dec. 3, 2003, 12 Pages.
"Office Action Issued in European Patent Application No. 16735791.2", dated May 31, 2019, 10 Pages.
"Office Action Issued in European Patent Application No. 16736331.6", dated Jun. 7, 2019, 13 Pages.
"Office Action Issued in European Patent Application No. 16736332.4", dated Jun. 7, 2019, 6 Pages.
"Office Action Issued in Chilean Patent Application No. 3310-2017", dated Mar. 14, 2019, 9 Pages.

* cited by examiner

FIG. 6

610
```
void f(); void g(); void h();
typedef void (*PFN)();

void x() {
  int a, z;
  PFN jump_table[] = { f, g, h };
...
  const int num_func = sizeof(jump_table)/
sizeof(jump_table[0]);

for (int i = 0; i <= num_func; ++i) {
    ++a;
    if (a < 97)
      a = z + 1;
    else
      a = z - 64 + 1;

(*jump_table[i])();
  }
}
```

620
```
    addi i, #0
    bro L0
L0:
    readl t1, a
    addi t2, t1, #1
    tlti p1, t2, #97
    br_t<p1> L1
    br_f<p1> L2
L1:
    readl t3, z
    add a, t3, #1
    bro L3
L2:
    readl t3, z
    readl t4, i
    sub t5, t3, #64
    add a, t5, t4
    bro L3
L3:
    readl t6, jump_table
    readl t7, i
    readl t8, num_func
    add t9, t6, t7
    lw t10
    call_f<p2> t10
    tlte p2, t7, t8
    br_t<p2> L0
```

630
```
E:  ADDI  #0        R1
F:  BRO   L0
L0:
0:  READL R1        T[2R]
1:  ADDI  #1        R2      T[2R]
2:  TLTI  #97       B[1P]
3:  BRO_T L1
4:  BRO_F L2
L1:
0:  READL R3        T[1R]
1:  ADD   #1        R2
2:  BRO   L3
L2:
0:  READL R3        T[2L]
1:  READL R1        T[3L]
2:  SUB   #64       T[3R]
3:  ADD             R2
4:  BRO   L3
L3:
0:  READL R4        T[3L]
1:  READL R1        T[3R]   T[6L]
2:  READL R5        T[6R]
3:  ADD             T[4R]
4:  LW              T[5R]
5:  CALL_F
6:  TLTE            B[1P]
7:  BRO_T L0
```

VERIFYING BRANCH TARGETS

BACKGROUND

Microprocessors have benefitted from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for verifying target locations calculated for branch instructions in block-based processor instruction set architectures (BBISAs). The described techniques and tools for solutions for improving processor performance can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, Personal Digital Assistants (PDAs), handheld devices, handheld computers, PDAs, touch screen tablet devices, tablet computers, wearable computers, and laptop computers.

In some examples of the disclosed technology, an apparatus comprises a block-based processor including one or more processing cores configured to fetch and execute instruction blocks and a control unit configured to, based at least in part on receiving a branch signal indicating a target location is received from one of the instruction blocks, verify that the target location is a valid branch target. In some examples, the branch signal includes a memory address, or reference to a memory address, of the target location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 6 illustrates examples of source and assembler code, as can be used in some examples of the disclosed technology.

DETAILED DESCRIPTION

I. General Considerations

Figure 1:
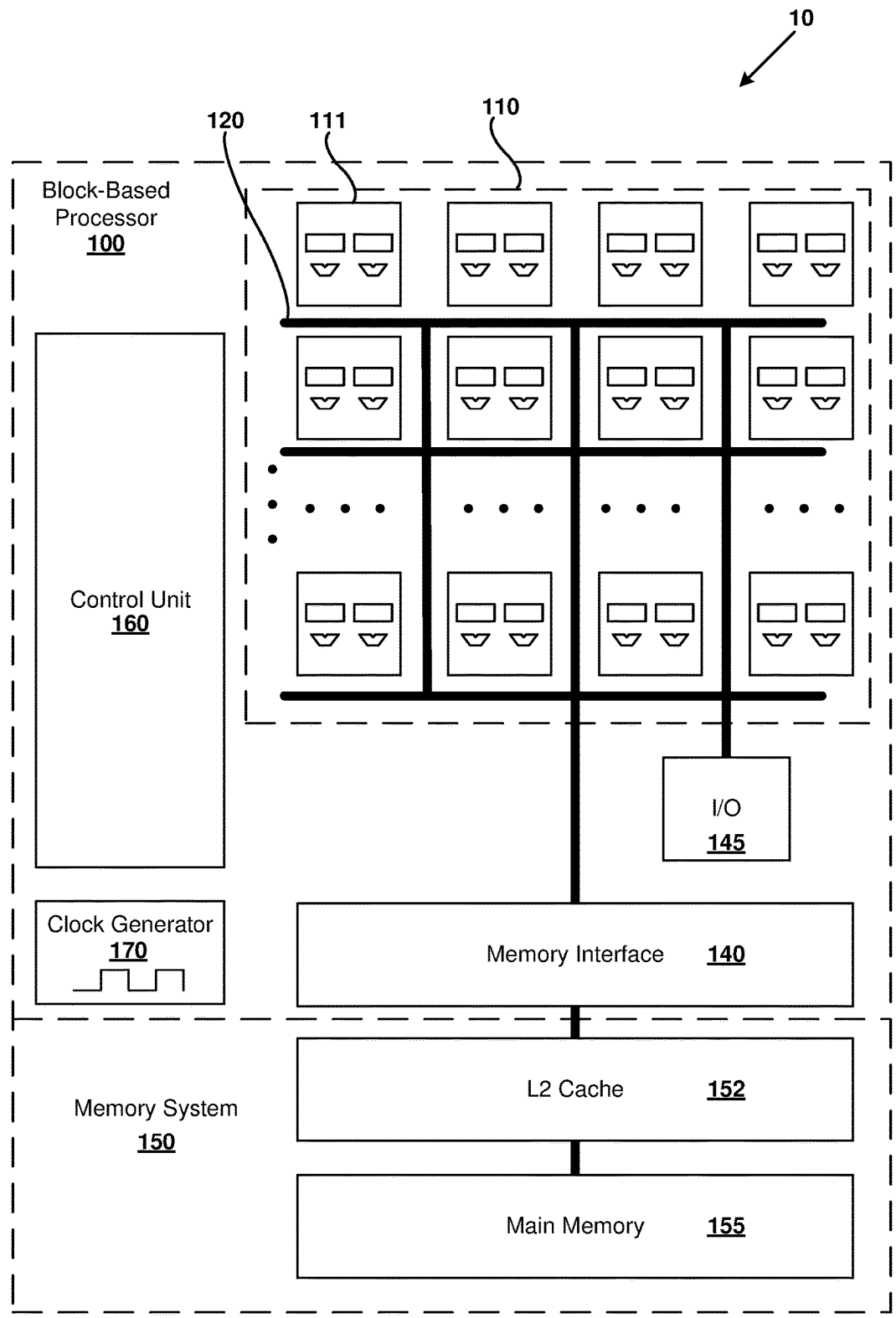
FIG. 1 illustrates a block-based processor core, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as Dynamic Random Access Memory (DRAM) or Static Random Access Memory (SRAM)), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java™, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor uses an Explicit Data Graph Execution (EDGE) ISA designed for area- and energy-efficient, high-ILP execution. In some examples, use of EDGE architectures and associated compilers finesses away much of the register renaming, CAMs, and complexity.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

As will be readily understood to one of ordinary skill in the relevant art, a spectrum of implementations of the disclosed technology are possible with various area and performance tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. As shown in FIG. 1 an external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface manages allocation of virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

In some examples, the instruction scheduler 206 is implemented using a general-purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general-purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

The control unit 160 includes a scheduler that is used to allocate instruction blocks to the processor cores 110. As used herein, scheduler allocation refers to directing operation of an instruction blocks, including initiating instruction block mapping, fetching, decoding, execution, committing, aborting, idling, and refreshing an instruction block. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added. The scheduler The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
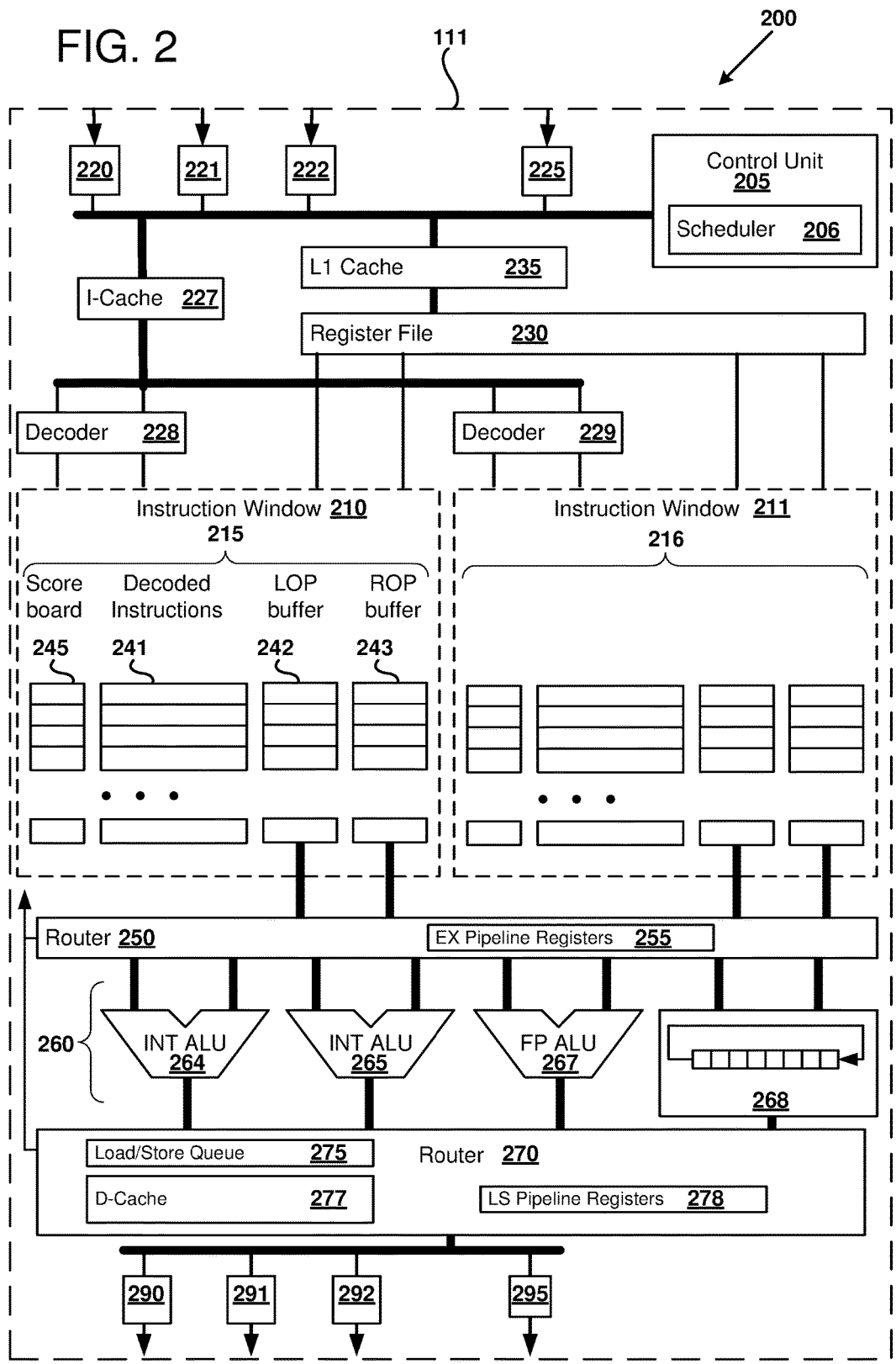
FIG. 2 illustrates a block-based processor core, as can be used in some examples of the disclosed technology.

FIG. 2 is a block diagram 200 further detailing an example microarchitecture for the block-based processor 100, and in particular, an instance of one of the block-based processor cores, as can be used in certain examples of the disclosed technology. For ease of explanation, the exemplary block-based processor core is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core 111 includes a control unit 205, which generates control signals to regulate core operation and schedules the flow of instructions within the core using an instruction scheduler 206. Operations that can be performed by the control unit 205 and/or instruction scheduler 206 can include allocation and de-allocation of cores for performing instruction processing, control of input data and output data between any of the cores, register files, the memory interface 140, and/or the I/O interface 145. The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory). In some examples, the control unit 205 and/or instruction scheduler 206 are implemented at least in part using one or more of: hardwired finite state machines, programmable microcode, programmable gate arrays, or other suitable control circuits.

The exemplary processor core 111 includes two instructions windows 210 and 211, each of which can be configured to execute an instruction block. In some examples of the disclosed technology, an instruction block is an atomic collection of block-based-processor instructions that includes an instruction block header and a plurality of one or more instructions. As will be discussed further below, the instruction block header includes information that can be used to further define semantics of one or more of the plurality of instructions within the instruction block. Depending on the particular ISA and processor hardware used, the instruction block header can also be used during execution of the instructions, and to improve performance of executing an instruction block by, for example, allowing for early fetching of instructions and/or data, improved branch prediction, speculative execution, improved energy efficiency, and improved code compactness. In other examples, different numbers of instructions windows are possible, such as one, four, eight, or other number of instruction windows.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instruction headers and/or instructions for an instruction block and stores the decoded instructions within a memory store 215 and 216 located in each respective instruction window 210 and 211.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (This application will refer to 32-bits of data as a word, unless otherwise specified.) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers may be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associate with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, and an instruction scoreboard 245. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. Instruction operands are read from the operand buffers 242 and 243, not the register file.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constrained and as directed by the control unit 205.

In some examples of the disclosed technology, front-end pipeline stages IF and DC can run decoupled from the back-end pipelines stages (IS, EX, LS). The control unit can fetch and decode two instructions per clock cycle into each of the instruction windows 210 and 211. The control unit 205 provides instruction window dataflow scheduling logic to monitor the ready state of each decoded instruction's inputs (e.g., each respective instruction's predicate(s) and operand (s) using the scoreboard 245. When all of the inputs for a particular decoded instruction are ready, the instruction is ready to issue. The control logic 205 then initiates execution of one or more next instruction(s) (e.g., the lowest numbered ready instruction) each cycle and its decoded instruction and input operands are send to one or more of functional units 260 for execution. The decoded instruction can also encodes a number of ready events. The scheduler in the control logic 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and instructions can be scheduled in a first-in first-out (FIFO) order from the ready queue. Information stored in the scoreboard 245 can include, but is not limited to, the associated instruction's execution predicate (such as whether the instruction is waiting for a predicate bit to be calculated and whether the instruction executes if the predicate bit is true or false), availability of operands to the instruction, or other prerequisites required before executing the associated individual instruction. The number of instructions that are stored in each instruction window generally corresponds to the number of instructions within an instruction block. In some examples, the number of instructions within an instruction block can be 32, 64, 128, 1024, or another number of instructions. In some examples of the disclosed technology, an instruction block is allocated across multiple instruction windows within a processor core.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 250 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core 200 until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 include a load/store queue 275, which can be used to issue memory instructions, a data cache 277, which stores data being input to or output from the core to memory, and load/store pipeline register 278.

The core also includes control outputs 295 which are used to indicate, for example, when execution of all of the instructions for one or more of the instruction windows 215 or 216 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block).

As will be readily understood to one of ordinary skill in the relevant art, the components within an individual core 200 are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control logic 205 of the processor cores 110. The area, clock period, capabilities, and limitations substantially determine the realized performance of the individual cores 110 and the throughput of the block-based processor 110.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some cases, the scheduler 206 accepts events for target instructions that have not yet been decoded and must also inhibit reissue of issued ready instructions. In some examples, instructions can be non-predicated, or predicated (based on a true or false condition). A predicated instruction does not become ready until it is targeted by another instruction's predicate result, and that result matches the predicate condition. If the associated predicate does not match, the instruction never issues. In some examples, predicated instructions may be issued and executed speculatively. In some examples, a processor may subsequently check that speculatively issued and executed instructions were correctly speculated. In some examples a misspeculated issued instruction and the specific transitive closure of instructions in the block that consume its outputs may be re-executed, or misspeculated side effects annulled. In some examples, discovery of a misspeculated instruction leads to the complete roll back and re-execution of an entire block of instructions.

Upon branching to a new instruction block, the respective instruction window(s) ready state is cleared (a block reset). However when an instruction block branches back to itself (a block refresh), only active ready state is cleared. The decoded ready state for the instruction block can thus be preserved so that it is not necessary to re-fetch and decode the block's instructions. Hence, block refresh can be used to save time and energy in loops.

V. Example Stream of Instruction Blocks

Figure 3:
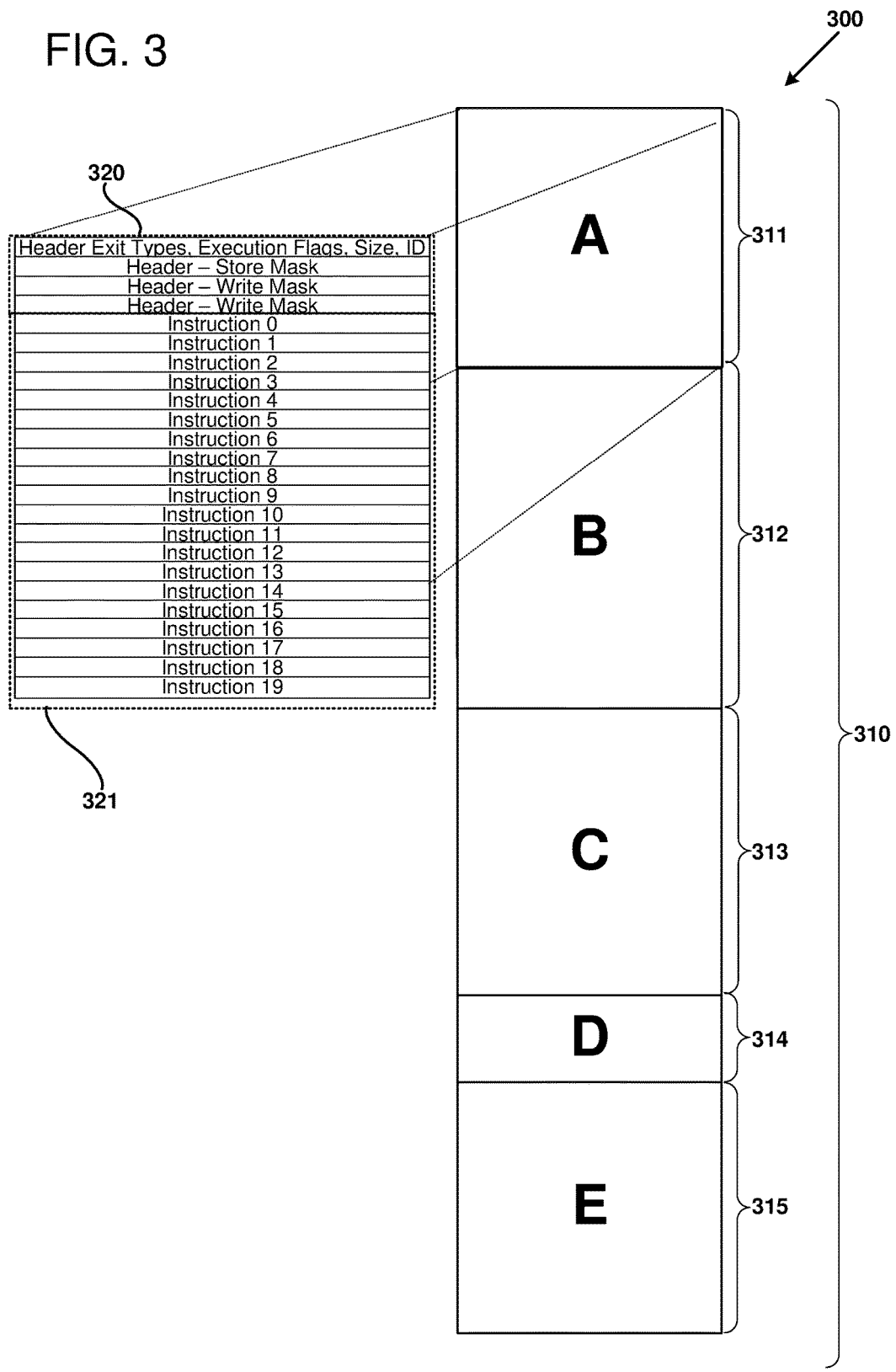
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-314 is illustrated. The stream of instructions can be used to implement user application, system services, or any other suitable use. In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an ID bit which indicates that the header is an instruction header and not an instruction. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include execution flags, which indicate special instruction execution requirements. For example, branch prediction or memory dependence prediction can be inhibited for certain instruction blocks, depending on the particular application.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or bad jump detection. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The instruction block header 320 also includes a store mask which identifies the load-store queue identifiers that are assigned to store operations. The instruction block header can also include a write mask, which identifies which global register(s) the associated instruction block will write. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

VI. Example Block Instruction Target Encoding

Figure 4:
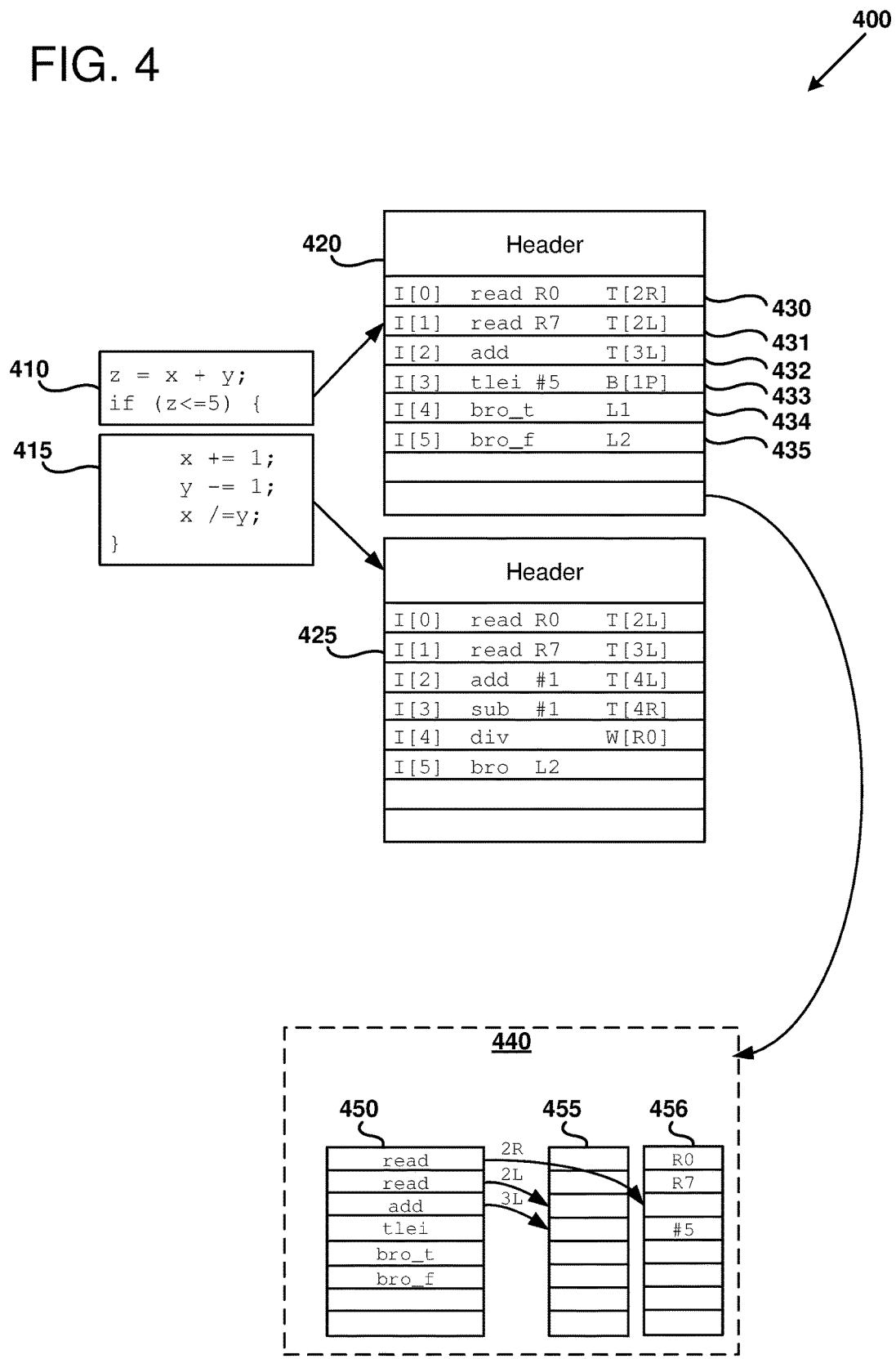
FIG. 4 illustrates portions of source code and instruction blocks, as can be used in some examples of the disclosed technology.

FIG. 4 is a diagram 400 depicting an example of two portions 410 and 415 of C language source code and their respective instruction blocks 420 and 425, illustrating how block-based instructions can explicitly encode their targets. In this example, the first two READ instructions 430 and 431 target the right (T[2R]) and left (T[2L]) operands, respectively, of the ADD instruction 432. In the illustrated ISA, the read instruction is the only instruction that reads from the global register file (e.g., register file 160); however any instruction can target, the global register file. When the ADD instruction 432 receives the result of both register reads it will become ready and execute.

When the TLEI (test-less-than-equal-immediate) instruction 433 receives its single input operand from the ADD, it will become ready and execute. The test then produces a predicate operand that is broadcast on channel one (B[1P]) to all instructions listening on the broadcast channel, which in this example are the two predicated branch instructions (BRO_T 434 and BRO_F 435). The branch that receives a matching predicate will fire.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R6 and R7 are written into the right and left operand buffers of ADD 432, marking the left and right operands of ADD 432 "ready." As a result, the ADD 432 instruction becomes ready, issues to an ALU, executes, and the sum is written to the left operand of TLEI 433.

VII. Example Block-Based Instruction Formats

Figure 5:
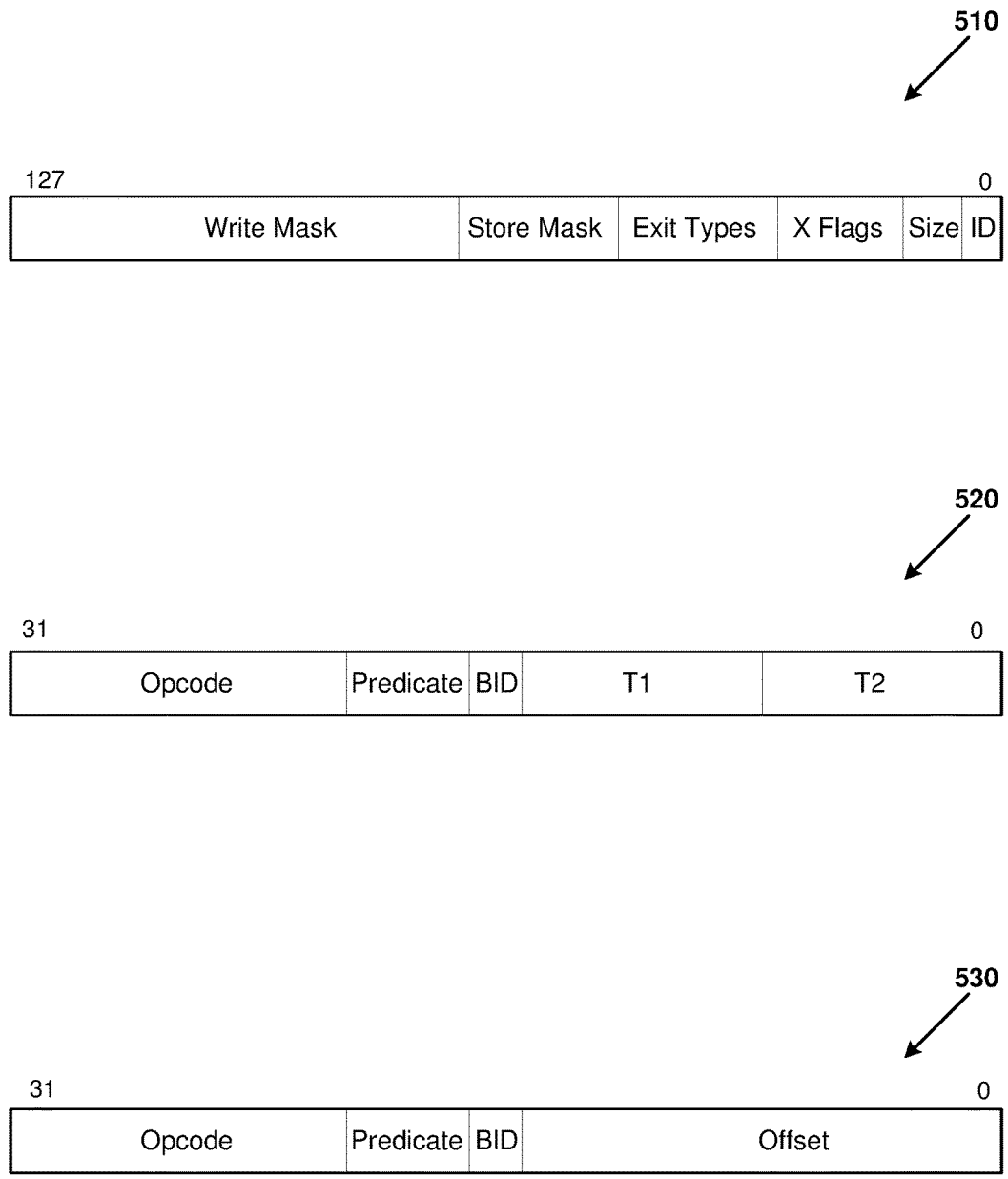
FIG. 5 illustrates block-based processor headers and instructions, as can be used in some examples of the disclosed technology.

FIG. 5 is a diagram illustrating generalized examples of instruction formats for an instruction header 510, a generic instruction 520, and a branch instruction 530. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a store mask field, a number of exit type fields, a number of execution flag fields, an instruction block size field, and an instruction header ID bit (the least significant bit of the instruction header).

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions. In some examples, up to six exit types can be encoded in the exit type fields, and the correspondence between fields and corresponding explicit or implicit control flow instructions can be determined by, for example, examining control flow instructions in the instruction block.

The illustrated generic block instruction 520 is stored as one 32-bit word and includes an opcode field, a predicate field, a broadcast ID field (BID), a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core. A broadcast identifier can be encoded in the generic block instruction 520.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specifying the instructions to which the results of the block-based instruction are sent. For example, an ADD instruction at instruction slot 5 can specify that its computed result will be sent to instructions at slots 3 and 10. Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

VIII. Example Source Code, Assembly Code, and Object Code Used with a Block-Based Processor FIG. 6 illustrates an example of program code for a number of instruction blocks as can be compiled and executed by a block-based processor. A short portion of C language source code 610 is shown. The C code 610 includes a number of symbols, including a, z, and jump_t-able, an if/else statement, a for loop, and a call through a jump_table. The C code 610 can be compiled by a suitable compiler for a block-based processor, which produces intermediate code, including the portion of intermediate code 620 shown, as a first pass. It should be noted that the C code 610 includes a programming error, because the for loops tests for i to be less than or equal to num_func, which will results in an unallocated portion of the jump_table array to be accessed and called.

The illustrated portion of intermediate code 620 includes a number of labels: L0, L1, L2, and L3, each of which corresponds to the start of instruction block. The intermediate code 620 also includes a number of intermediate instructions, with the operands still mapped to the symbol names (e.g., a, z, and jump_table) present in the C code 610. Intermediate values are assigned to temporary operands (e.g., t1, t2, t3, etc.) that will be reassigned to instruction targets when final assembly code 630 is generated. The intermediate code 620 also includes a number of predicates p1 and p2, which will be assigned broadcast values in the final assembly code 630.

The compiler generates the final assembly code 630, which in turn will be used to generate machine code (object code) for execution. As shown, the final assembly code 630 has instructions mapped to slots within each of the instruction blocks (0, 1, 2, 3, . . . ) and also has the source code symbols to global registers. Further, the temporary operands and predicates have been mapped to instruction targets and broadcast predicates, respectively. Thus, the final assembly code 630 is in condition to be mapped to machine code instructions for a block-based processor.

Figure 7:
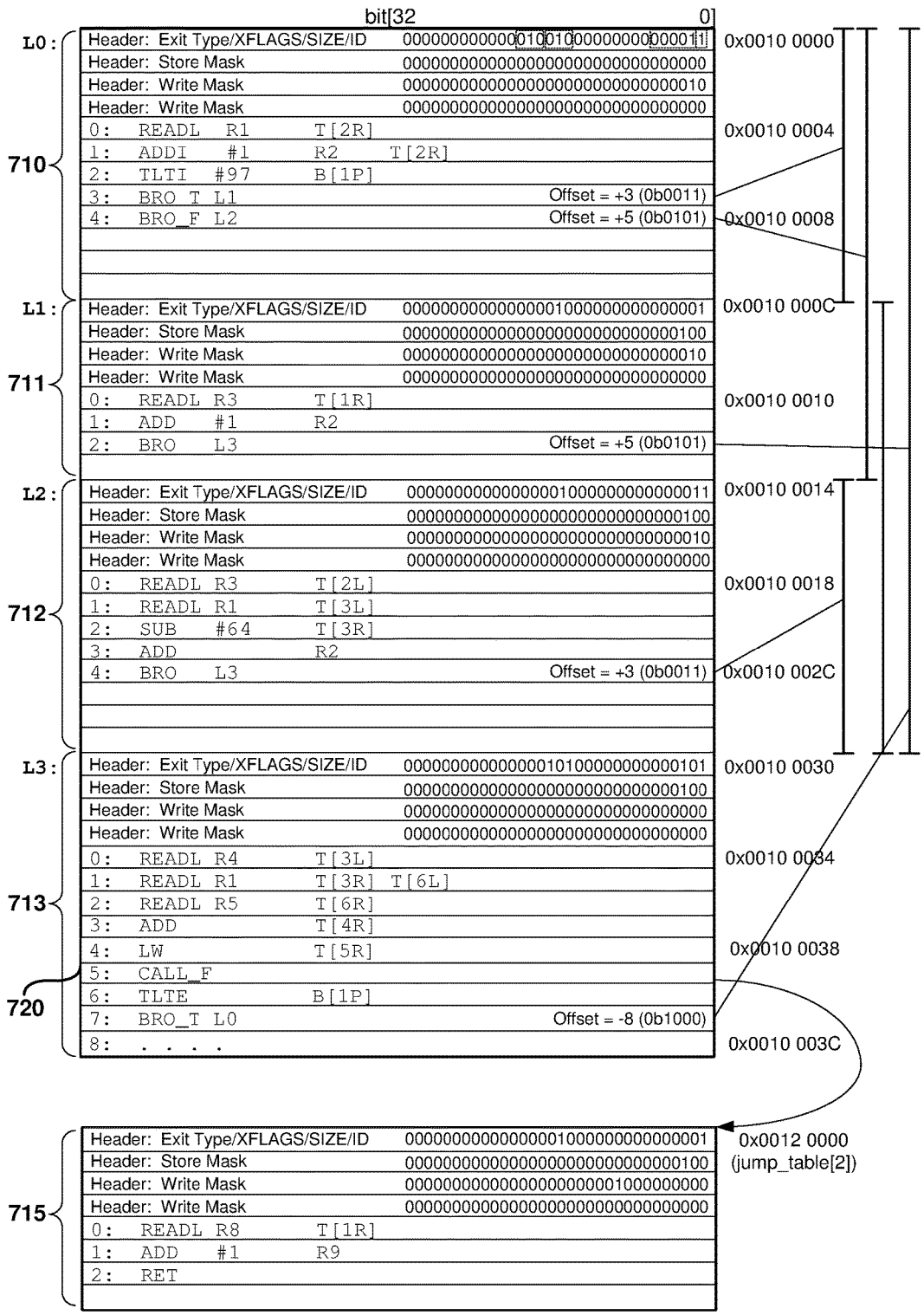
FIG. 7 illustrates a number of instructions blocks, as can be used in some examples of the disclosed technology.

FIG. 7 depicts a number of instruction blocks 710-713 that have been generated and stored in memory from the final assembly code 630 of FIG. 6. Also shown is another instruction block 715 that is pointed to by the jump_table array at offset 2. The machine code shown in FIG. 7 is for illustrative purposes only, and does not include all of the machine code that would be present in a fully-compiled set of object code. The object code in FIG. 7 is shown being stored starting at memory location 0x00100000 as a number of 32-bit words. From right to left, the first word of the header includes a single ID bit (bit[0], value 1), a 5-bit size field (bits [5:1], value 00001) which indicates the size of the instruction block, eight words (to store seven instructions), and two exit-type fields (bit[16:14], value 010; and bit[19:17], value 010) which are the offset exit types for the two branch instructions within this instruction block. The machine code values for these examples are in binary format.

Thus by providing an instruction block header for the atomic block of instructions certain performance improvements can be realized by the block-based processor, for example speculative execution and/or branch prediction.

The instruction block headers shown in FIG. 7 include store masks and write masks, which also allow for further prefetching, caching, and storing of results between particular instruction blocks. The store mask and write mask can also be used by control logic to determine when an instruction block can be committed that is it is determined that execution of certain instructions within a particular instruction block can and should actually be complete and results committed to memory and/or to the register file.

As shown in FIG. 7, target locations for the branch instructions can expressed as an offset from the beginning of the instruction block. In instruction block 710, for example, the target location for the br_t branch instruction is offset plus three 4-word chunks away from the header for the first branch instruction to label L1. The target location for the br_f branch instruction is an offset of plus five 4-word chunks of instructions to the label L2. It will typically more efficient to express the branch offsets from the beginning of the instruction block, but in some examples the offset could be expressed as an offset from the particular branch instruction location in memory, for example and offset from memory location 0x100009 or 0x10000A for these br_t and br_f instructions. Only the least significant bits of the branch offset are shown, but the branch offset is typically a signed integer of, for example, 21 bits, which allows for direct branches to over 32 million address locations. In other examples, the branch offset field can be shorter or longer, depending on the particular ISA.

The other three instruction blocks 711-713 and 715 have different headers depending on the size of the instruction block, the exit type of any branch instructions within the instruction block, the memory stores within the instruction block, and/or any registers written by the instruction block. An outline of the table header information is summarized below in Table 1:

TABLE 1

| Header Block | ID [0] | Instruction Block Size [5:1] | XFLAGS [13:6] | Exit Type [31:14] | Store Mask [63:32] | Write Mask [127:64] |
|---|---|---|---|---|---|---|
| 710 | 1 | 8 words => 00001 | N/A => 00000000 | Offset1 => 010<br>Offset2 => 010 | N/A | R2 => 00010 [5:0] |
| 711 | 1 | 4 words => 00000 | N/A => 00000000 | Offset1 => 010 | N/A | R2 => 00010 [5:0] |
| 712 | 1 | 8 words => 00001 | N/A => 00000000 | Offset1 => 010 | N/A | R2 => 00010 [5:0] |
| 713 | 1 | 4 words => 00000 | N/A => 00000000 | Call => 100<br>Offset1 => 010<br>Return => 101 | N/A | N/A => 000000 [5:0] |
| 714 | 1 | 4 words => 00000 | N/A => 00000000 | Return => 101 | N/A | R9 => 1000000000 [9:0] |

In some examples of the disclosed technology, block-based processors can also support branch instruction target locations that are computed. As shown, a CALL instruction 720 within instruction block 713 is executed when i is equal to 2. The memory address stored at jump_table[2] (0x0012 0000) is sent to the CALL instruction right operand (T[5R]), and program execution is transferred to the instruction block 715 by, for example, updating the program counter (PC).

Thus, target locations for branch instructions are not limited to offsets, but can include memory addresses calculated dynamically at runtime.

The processor core control unit (e.g., control unit 205) and/or the processor core control unit (e.g., control unit 16) can be used configured to verify that the target location is a valid branch target using any of the techniques disclosed herein. In the event that the target location is determined to be valid, the control unit updates the program counter (PC) and execution proceeds to the next instruction block. In the event that the target location is determined to not be valid, an exception is raised and error processing is initiated, as discussed further below.

Figure 8:
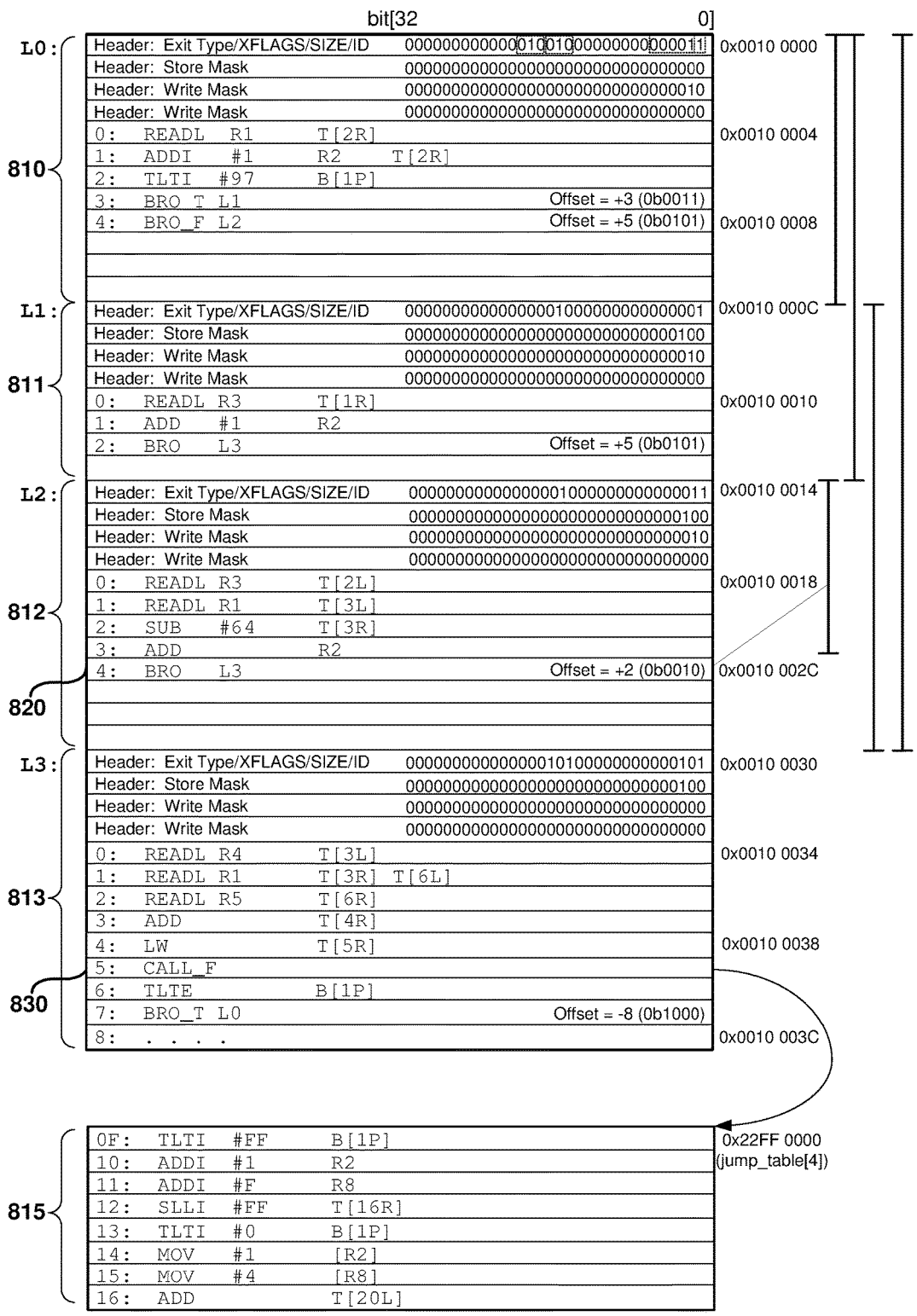
FIG. 8 is another example of instruction blocks, as can be used in some examples of the disclosed technology.

FIG. 8 is an example of instructions blocks 810-813 of machine code for the same assembly code from FIG. 7, but which includes two errors that can be detected using methods and apparatus disclosed herein.

As shown in FIG. 8, one of the branch instructions 820 has a target location that is not at the beginning of an instruction block. Branch instruction 820 has an offset of +2, which would resolve to an address of 0x00010, which is the first instruction in an instruction block but not the instruction header for the instruction block. Such an error could have been cause by, for example, a compiler error, communication error, tampering, or corruption of storage media storing the branch instructions. Executing an instruction block starting from the first instruction, or interpreting the data stored at that location as an instruction header, could lead to errors, unpredictable operation, or other hardware failures.

Also shown in FIG. 8, the CALL instruction 830 will reference an invalid memory location, jump_table[4]. The memory address calculated by dereferencing jump_table[4] would cause execution to proceed from the 16th (0x0F) instruction within another instruction block 815. This error is caused because the C language source code 610 improperly specifies a less than or equal operation to compare the table size to the loop index i. Thus, the value stored at jump_table[4] may be undefined or otherwise point to an invalid memory location for the beginning of an instruction block.

Thus, such improper branch instructions should be avoided, or an exception raised such that the operating system or other exception handler can take appropriate action. For example, the control unit 205 can be configured to verify that the target location is a valid branch target by: checking that one or more ID bits stored at the target location match an architectural specification for the block-based processor (e.g., that one or more ID bits stored at the first byte of the target location match a specified bit pattern), by verifying that an instruction block header stored at the target location conforms to a specification for an instruction block header (e.g., that all the fields of the header conform to the ISA specification for an instruction header), and/or by verifying that the target location is at a valid memory address for storing an instruction block (e.g., falls at a 4-byte memory address boundary). In some examples, the control unit 205 can verify aspects of the instruction header in conjunction with aspects of one or more instruction within the corresponding instruction block (for example, that write mask and store mask bits correspond to valid fields in instructions in the block).

IX. Example Block-Based Processor and Memory Configuration

Figure 9:
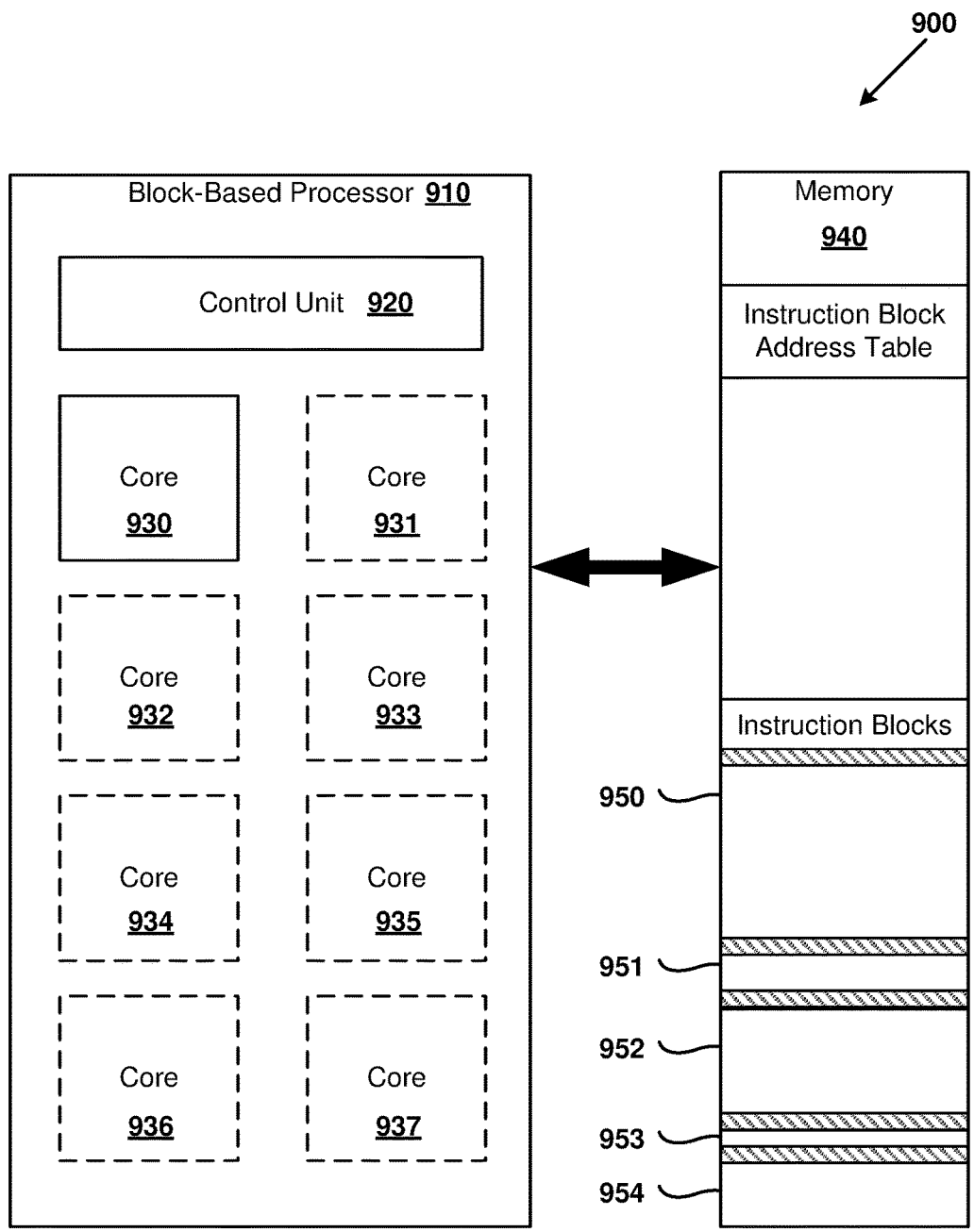
FIG. 9 is a diagram illustrating a block-based processor and memory, as can be used in some examples of the disclosed technology.

FIG. 9 is a diagram 900 illustrating an apparatus comprising a block-based processor 910, including a control unit 920 configured to verify whether a branch instruction target location is a valid branch target location and one or more processer cores 930-937 configured to fetch and execute instruction blocks and a control unit 920, when a branch signal indicating the target location is received from one of the instruction blocks. The illustrated block-based processor 910 has up to eight cores, but in other examples there could be 64, 512, 1024, or other numbers of block-based processor cores. The block-based processor 910 is coupled to a memory 940 which includes a number of instruction blocks 950-955. In some examples of the disclosed technology, an instruction block address table 960 can be stored in memory, or built dynamically at run time, to indicate legal addresses for the beginning of instruction blocks, in addition to, or instead of, using an instruction block header to indicate valid target locations at the start of the instruction blocks 950-954.

As used herein, the term branch instruction is not limited to relative branches, unless stated otherwise. For example, branch instructions includes: branches relative to an offset value, absolute branches (jumps) to a memory address, subroutine calls, subroutine returns, or other suitable forms of changing instruction execution flow within a block-based processor. In some examples, the current address of an instruction or of an instruction block is stored in a program counter, which can be a special register within the register file, or a designated memory location in the memory.

A number of techniques can be used to verify that the target location is a valid branch target. For example the control unit can be configured to verify that the target location is valid by checking that one or more bits stored at the target location backs an architectural specification for the block-based processor. For example in embodiments where an instruction header is used, one or more bits at the target location are set to a specified pattern to indicate that the target location is valid. Other examples are possible. For example by convention, each instruction block can be specified to start with a particular instruction, for example reading data from a system stack, clearing or checking processor flags, or other suitable operations. In some examples, a control unit of a processor core or a processor is configured to verify the target location by verifying that an instruction block header is stored at the target location. In some examples, the control unit verifies the target location by verifying that an instruction block header stored at the target location conforms to a specification for an instruction block header. In some examples, the control unit is configured to verify that the target location is at a valid memory address for storing an instruction block. For example the valid memory address can be divided modulo 4 in architectures that only support instruction blocks beginning every fourth memory address. In some examples, the branch signal is generated by executing a conditional branch instruction by one of the processing cores and the target location is indicated by a memory location offset relative to the conditional branch instruction, or to the instruction header that starts the instruction block in which the branch instruction is located. In some examples, the block-based processor is implemented as a custom integrated circuit, an application-specific integrated circuit, a field-programmable gate array and/or in a system on chip module. The block-based processor can also be emulated by a general purpose processor, in certain examples of the disclosed technology.

In some examples of the disclosed technology, a set of valid block addresses can be deduced by enumerating blocks, starting from the first block, on each, adding the size of one block to the start of that block to determine the start of the next block.

In some examples, an array, hash table, Bloom filter, or other search structure can contain the address of each valid block, and a branch to an invalid block can be deduced by failing to find the branch target in the search structure.

In some examples, a function over the branch target address can determine whether the branch target is a valid target. For example, by selecting block addresses that have even parity, a branch to an address with odd parity cannot be a valid block.

In some examples, some property of the branch target address is present in the block header and employed to determine a branch to an invalid address. For example, the parity of the branch target address can be added to the block header.

X. Example Method of Verifying Branch Instruction Target Location

Figure 10:
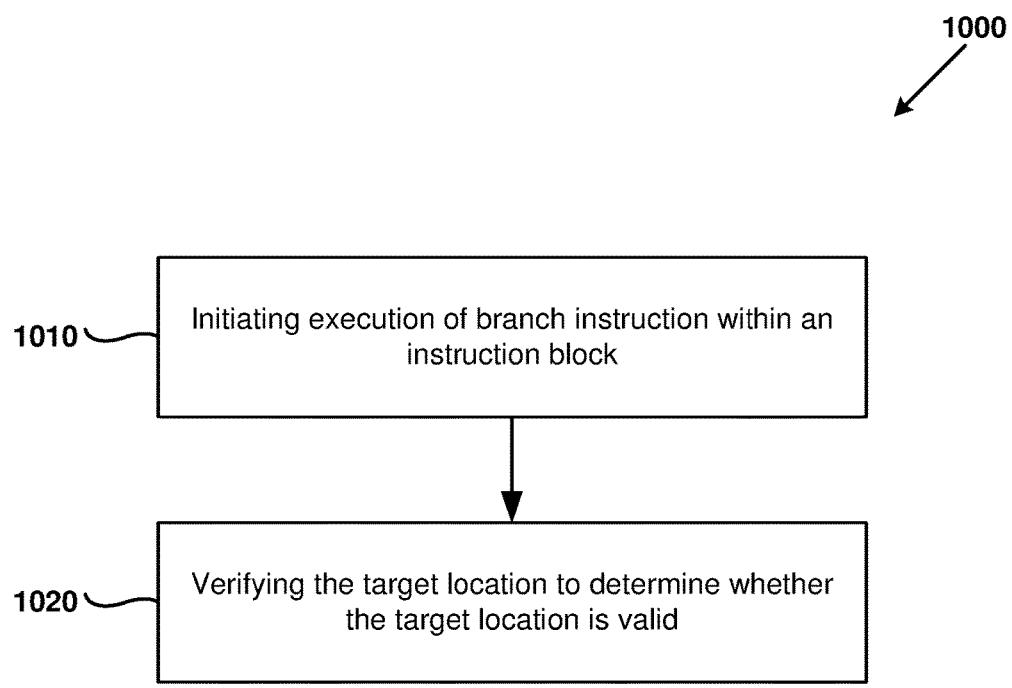
FIG. 10 is a flowchart illustrating an example method of verifying a target location, as can be performed in some examples of the disclosed technology.

FIG. 10 is a flowchart 1000 outlining an exemplary method of verifying that a target location of a branch instruction is valid.

At process block 1010, execution of a branch instruction within an instruction block is initiated. For example, when a predicate indicates that a branch instruction should execute, and its operand data is available, execution of the branch instruction can be initiated. When the target location has been calculated, the method proceeds to process block 1020 to verify the branch instruction target location.

At process block 1020, the target location is verified to determine whether the target location is valid. For example logic in a processor core can determine whether the branch instruction target location calculated at process block 1010 is valid based on, for example, values of operands associated with the branch instruction. In some examples, by the ISA specification the first bit of an instruction header is designated to be always be 1. In other examples, more than one bit, or different bit values (0, 10, 010, etc.) can be used.

In some examples, the target location is verified at least in part by verifying that the target location memory address modulo a certain amount is 0. For example, in a 32-bit word-aligned architecture, the memory address is checked to determine that it is divisible by 4. In some examples, the instruction header and/or instructions associated with the target location can be validated to determine that they are indeed valid instructions. For example, certain arrangements of bits and particular fields may be illegal or reserved, and in these cases an exception is raised if the target location is not validated. If the target location is verified as being valid, fetching and execution of the instruction block at the target location can be allowed to proceed. Conditions that can be detected and verified using the exemplary method of FIG. 10 include detecting instruction blocks that are not chunk aligned, illegal encoding of instructions and/or instruction blocks, bad jump to a register location, bad jump to an offset, bad jump to a next sequential instruction block, or other conditions, including security vulnerabilities or buffer overruns.

XI. Example Method of Verifying Branch Instruction Target Location

Figure 11:
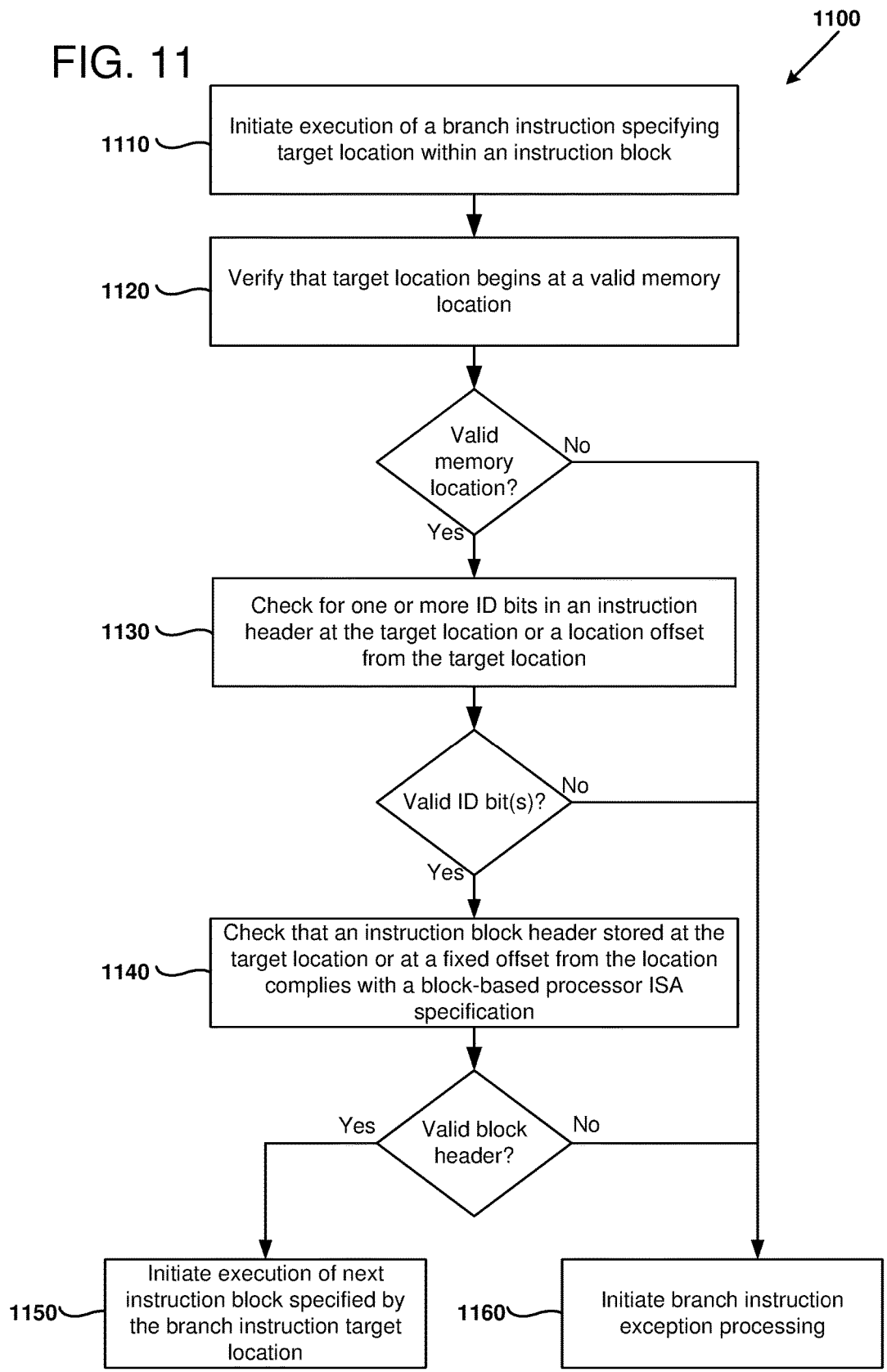
FIG. 11 is a flowchart illustrating an example method of verifying a target location, as can be performed in some examples of the disclosed technology.

FIG. 11 is a flowchart 1100 outlining an exemplary method of checking for valid target locations of branch instructions, as can be performed in certain examples of this technology. In some examples, the method outlined in the flowchart 1100 can be performed at least in part using a control unit (e.g., processor control unit 160 and/or processor core control unit 205) to control the execution flow of a block-based processor.

At process block 1110, the processor initiates execution of a branch instruction specifying a target location within an instruction block. For example the branch instruction can be a relative branch, an absolute jump, a subroutine call, or a subroutine return, or other instruction that changes the order of an instruction flow for an instruction block. Initiation of the branch instruction includes calculation of a target location for the branch instruction, for example, as a memory address. After calculating the target location, the method proceeds to process block 1120.

At process block 1120, the method verifies that the branch instruction target location begins at a valid memory location. For example, according to the particular instruction set architecture of a block-based architecture, a valid memory location may need to be divisible by 4, 8, 16, or another memory alignment. In some examples, instruction blocks may only be stored at a certain limited range of memory locations. In some examples, instruction blocks may only be located in portions of memory designated as read-only, to prevent execution of data or untrusted code. In some examples, instruction blocks are only executed when located in designated portions of memory depending on whether the processor is in a user or a protected mode. In some examples, other restrictions on target locations for branch instructions may be imposed by the instruction set architecture for various other reasons. If the branch instruction target location is determined to be a valid memory location, then the method proceeds to process block 1130, otherwise the method proceeds to process block 1160.

At process block 1130, the method checks for one or more identification (ID) bits and an instruction header at the target location, or alternatively, at a location offset from the targeted location. For example some instruction set architectures could have a convention whereby the target location is offset by 4, 8, or some other number of words, before or after the address of the target location. Regardless of the target location offset, the method checks for the existence of ID bits stored in memory at the corresponding target location. For example in some architectures an instruction header by convention stores a 1 at the least significant bit of the first word of the instruction header. As will be readily understood to one of skill in the art, other conventions for ID bits are possible, and there can be more than one bit used to designate the instruction header. If the method determines that the ID bits are valid, the method proceeds to process block 1140, otherwise the method proceeds to process block 1160.

At process block 1140, the method checks that an instruction block header stored at the target location (or at a fixed offset from the location) complies with a block-based processor instruction set architecture specification. For example, depending on the architecture specification, certain other requirements of fields of the instruction block header can be imposed and in turn checked to verify that the target location indeed points to a valid block header. If the method determines that the block header is valid, then the method proceeds to process block 1150. Otherwise the method proceeds to process block 1160.

At paragraph 1150, the method initiates execution of the next instruction block specified by the branch instruction target location. In some examples, the target location may not be actually specified within the branch instruction, but can be specified by convention (e.g., the memory location at the next 4-byte chunk in memory). In some examples, if an instruction block is missing a branch instruction at the end, by convention the processor proceeds to execute the next instruction block in memory.

At paragraph 1160, the method initiates branch instruction exception processing. For example the branch instruction exception processing can include, but is not limited to, generation of an interrupt, transferring execution to a supervisory process, transferring execution to the operating system, transferring execution to a branch exception handler routine, initiating a core dump of the contents of memory at the current program counter location, initiating a signal or displaying information using a graphical user interface that indicates the existence of a branch instruction exception, or other suitable exception processing techniques.

XII. Exemplary Computing Environment

Figure 12:
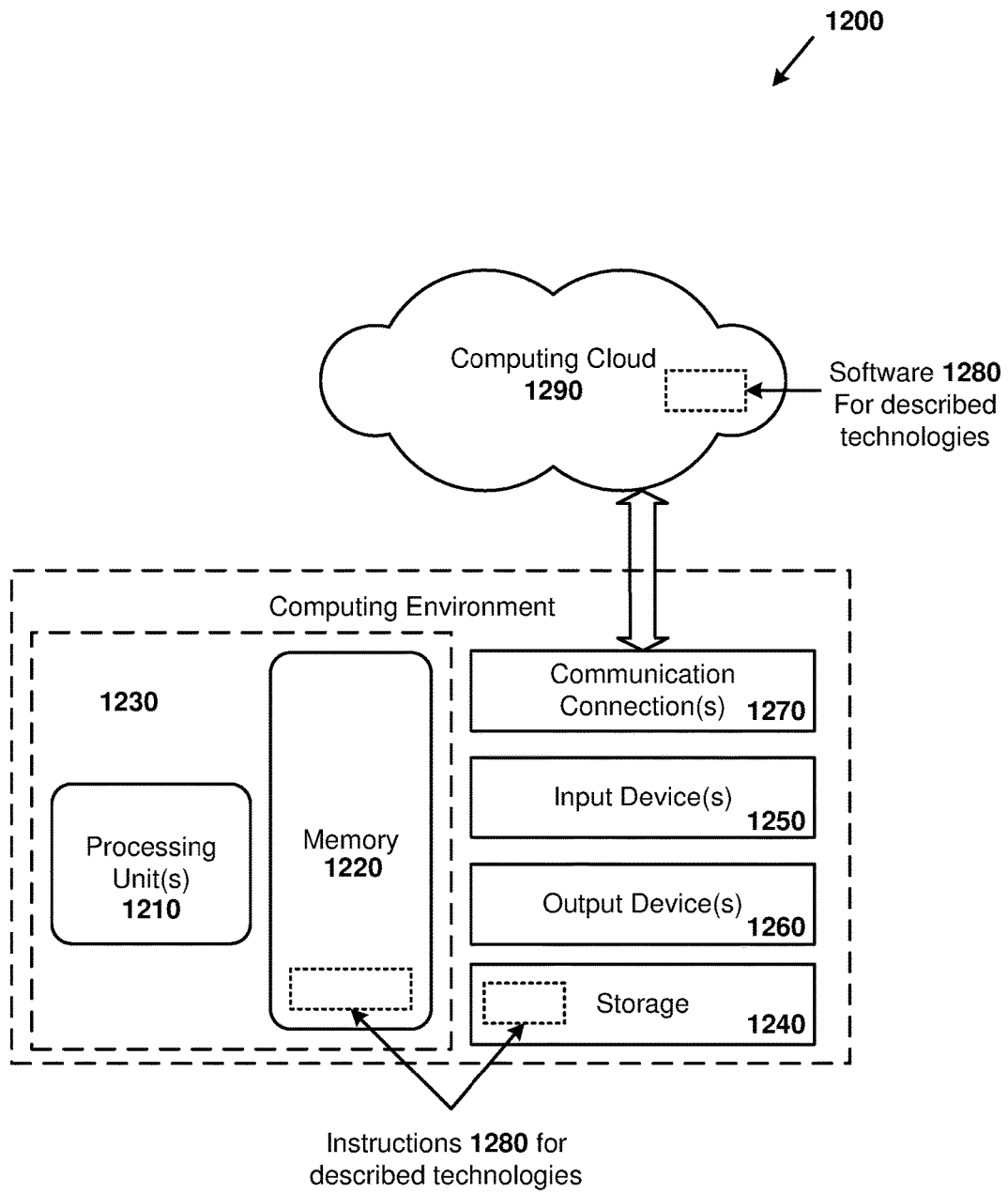
FIG. 12 is a block diagram illustrating a suitable computing environment for implementing some embodiments of the disclosed technology.

FIG. 12 illustrates a generalized example of a suitable computing environment 1200 in which described embodiments, techniques, and technologies, including bad jump detection in a block-based processor, can be implemented. For example, the computing environment 1200 can implement disclosed techniques for verifying branch instruction target locations, as described herein.

The computing environment 1200 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 12, the computing environment 1200 includes at least one block-based processing unit 1210 and memory 1220. In FIG. 12, this most basic configuration 1230 is included within a dashed line. The block-based processing unit 1210 executes computer-executable instructions and may be a real or a virtual processor. In a multi-processing system, multiple processing units execute computer-executable instructions to increase processing power and as such, multiple processors can be running simultaneously. The memory 1220 may be volatile memory (e.g., registers, cache, RAM), non-volatile memory (e.g., ROM, EEPROM, flash memory, etc.), or some combination of the two. The memory 1220 stores software 1280, images, and video that can, for example, implement the technologies described herein. A computing environment may have additional features. For example, the computing environment 1200 includes storage 1240, one or more input devices 1250, one or more output devices 1260, and one or more communication connections 1270. An interconnection mechanism (not shown) such as a bus, a controller, or a network, interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, CD-ROMs, CD-RWs, DVDs, or any other medium which can be used to store information and that can be accessed within the computing environment 1200. The storage 1240 stores instructions for the software 1280, plugin data, and messages, which can be used to implement technologies described herein.

The input device(s) 1250 may be a touch input device, such as a keyboard, keypad, mouse, touch screen display, pen, or trackball, a voice input device, a scanning device, or another device, that provides input to the computing environment 1200. For audio, the input device(s) 1250 may be a sound card or similar device that accepts audio input in analog or digital form, or a CD-ROM reader that provides audio samples to the computing environment 1200. The output device(s) 1260 may be a display, printer, speaker, CD-writer, or another device that provides output from the computing environment 1200.

The communication connection(s) 1270 enable communication over a communication medium (e.g., a connecting network) to another computing entity. The communication medium conveys information such as computer-executable instructions, compressed graphics information, video, or other data in a modulated data signal. The communication connection(s) 1270 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1290. For example, disclosed compilers and/or block-based-processor servers are located in the computing environment 1230, or the disclosed compilers can be executed on servers located in the computing cloud 1290. In some examples, the disclosed compilers execute on traditional central processing units (e.g., RISC or CISC processors).

Computer-readable media are any available media that can be accessed within a computing environment 1200. By way of example, and not limitation, with the computing environment 1200, computer-readable media include memory 1220 and/or storage 1240. As should be readily understood, the term computer-readable storage media includes the media for data storage such as memory 1220 and storage 1240, and not transmission media such as modulated data signals.

XIII. Additional Examples of the Disclosed Technology

Additional examples of the disclosed subject matter are discussed herein in accordance with the examples discussed above.

In some examples of the disclosed technology, a control unit is configured to verify the target location by checking that one or more bits stored at the target location complies with an architectural specification for a block-based processor. In some examples, the control unit is configured to verify the target location by verifying that an instruction block header is stored at the target location. In some examples, the control unit is configured to verify the target location by verifying that an instruction block header stored at the target location conforms to a specification for an instruction block header. In some examples, the control unit is configured to verify that the target location is at a valid memory address for storing an instruction block.

In some examples of the disclosed technology, an apparatus comprises a block-based processor including one or more processing cores configured to fetch and execute instruction blocks and a control unit configured to, based at least in part on receiving a branch signal indicating a target location is received from one of the instruction blocks, verify that the target location is a valid branch target. In some examples, the branch signal includes a memory address of the target location.

In some examples of the disclosed technology, a method of detecting an invalid branch instruction in a block-based processor includes initiating execution of a branch instruction within an instruction block, the branch instruction specifying a target location from which to fetch a next instruction block for execution by the block-based processor, and verifying the target location by comparing data designating the instruction block to determine whether the target location is valid. In some examples, the branch is specified implicitly (e.g., based on one or more bits of the instruction block header). In some examples, the branch instruction does not explicitly specify the target location (e.g., return or call instructions).

In some examples of the disclosed technology, one or more non-transitory computer-readable storage media storing computer-executable instructions for a block-based processor, include one or more instruction blocks, each of the instruction blocks including an instruction block header comprising an identifier (ID) field comprising one or more ID bits identifying the respective each of the instruction block headers as a legal branch target location.

In some examples of the disclosed technology, a compiler emits instruction blocks including an instruction block header and a plurality of two or more instructions executable on a block-based processor.

In certain examples of the disclosed technology, an apparatus includes a block-based processor having one or more processing cores configured to fetch and execute instruction blocks. The apparatus also includes a control unit configured to, based at least in part on receiving a branch signal indicating a target location is received from one of the instruction blocks, verify that the target location is a valid branch target.

In some examples of the apparatus, the branch signal includes a memory address of the target location. In some examples, the control unit is further configured to verify the target location by checking that one or more bits stored at the target location match an architectural specification for the block-based processor. In some examples, the control unit is further configured to verify the target location by verifying that an instruction block header is stored at the target location.

In some examples, the control unit is configured to verify the target location by verifying that an instruction block header stored at the target location conforms to a specification for an instruction block header. In some examples, the control unit is further configured to verify that the target location is at a valid memory address for storing an instruction block. In some examples, the branch signal is generated by executing a conditional branch instruction by one of the processing cores, and the target location is indicated by a memory location relative to the conditional branch instruction. In some examples, the block-based processor is implemented as a field programmable gate array, an application-specific integrated circuit, and/or an integrated circuit. In some examples, the control unit verifies the target location by verifying that the first bit at the target location is a one (1).

In some examples of the disclosed technology, a method of detecting an invalid branch instruction in a block-based processor includes initiating execution of a branch instruction within an instruction block, the branch instruction specifying a target location from which to fetch a next instruction block for execution by the block-based processor, and verifying the target location by comparing data designating the instruction block to determine whether the target location is valid.

In some examples of a method of detecting an invalid branch instruction, the verifying includes checking for a bit pattern at the target location or at a fixed offset from the target location. In some examples, the verifying includes checking that a header stored at the target location or at a fixed offset from the target location complies with an instruction set specification for the block-based processor. In some examples, the data designating the instruction block is stored as an instruction block header within the instruction block. In some examples, the data designating the instruction block is stored in a table comprising a plurality of valid instruction block addresses. In some examples, the method further includes, if the target location is determined to be valid, then initiating execution of the next instruction block. In some examples, the method further includes, if the target location is determined to not be valid, then executing instructions for handling a branch address exception.

In some examples of the disclosed technology, one or more computer-readable storage media storing computer-executable instructions for a block-based processor include one or more instruction blocks, each of the instruction blocks including an instruction block header comprising an identifier (ID) field comprising one or more ID bits identifying the respective each of the instruction block headers as a legal branch target location. In some examples, the instruction blocks include two or more instructions, each of the instructions comprising bits in a corresponding position as the instruction header ID field that identify the respective instruction as an illegal branch target location. In some examples, the ID field is the least significant bit of a first word of the instruction block header, and wherein the least significant bit of the first word is a one (1).

In some examples, one or more computer-readable storage media store computer-executable instructions for a block-based processor, that when executed, cause the processor to perform any of the methods disclose herein.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. An apparatus comprising a processor, the processor comprising:
   at least one processing core configured to fetch and execute a current instruction block;
   a control unit configured to, based on receiving a branch signal when executing the current instruction block, the branch signal indicating a target location where a next instruction block is stored in memory, verify that an instruction block header stored at the target location conforms to a specification for an instruction block header by:
checking that one or more bits stored at the target location match a specified bit pattern,
verifying that at least one field of the header conforms to an ISA specification for an instruction header, or
checking that one or more bits stored at the target location match a specified bit pattern and verifying that at least one field of the header conforms to the ISA specification for an instruction header; and
when the control unit verifies that the instruction block header does conform to the specification, transfer control of the at least one processing core to the next instruction block stored in memory at the target location.

2. The apparatus of claim 1, wherein the branch signal includes a memory address of the target location.

3. The apparatus of claim 1, wherein the control unit is configured to verify that the instruction block header stored at the target location conforms to a specification by checking that one or more bits stored at the target location match an architectural specification for the processor.

4. The apparatus of claim 1, wherein the control unit is further configured to verify that the target location is at a valid memory address for storing an instruction block.

5. The apparatus of claim 1, wherein the branch signal is generated by executing a conditional branch instruction by one of the processing cores, and wherein the target location is indicated by a memory location relative to the conditional branch instruction.

6. The apparatus of claim 1, wherein the processor is implemented as a field programmable gate array, an application-specific integrated circuit, or an integrated circuit.

7. The apparatus of claim 1, wherein the verifying that the instruction block header stored at the target location conforms to the specification comprises verifying that the first bit at the target location is a one (1).

8. The apparatus of claim 1, wherein the control unit is further configured to, when the target location is verified to be a valid branch target, initiate execution of the next instruction block.

9. The apparatus of claim 1, wherein the control unit is further configured to, when the target location is verified to be a valid branch target, execute instructions for handling a branch address exception.

10. The apparatus of claim 1, wherein the verifying that an instruction block header stored at the target location conforms to a specification for an instruction block header does not comprise checking that one or more bits stored at the target location match a specified bit pattern.

11. The apparatus of claim 1, wherein the verifying that an instruction block header stored at the target location conforms to a specification for an instruction block header does not comprise verifying that at least one field of the header conforms to the ISA specification for an instruction header.

12. One or more computer-readable storage devices or memory storing computer-executable instructions for a processor, the computer-executable instructions including:
an instruction block storing:
an instruction block header stored at the start of the instruction block and comprising an identifier (ID) field comprising one or more ID bits identifying the instruction block header as a legal branch target location, the ID bits comprising at least one bit that matches a specified bit pattern for the instruction block header; and
at least two instructions.

13. The one or more computer-readable storage devices or memory of claim 12, wherein each of the at least two instructions comprises bits in a corresponding position as the instruction header ID field that identify the respective instruction as an illegal branch target location.

14. The one or more computer-readable storage devices or memory of claim 12, wherein the ID field is the least significant bit of a first word of the instruction block header, and wherein the least significant bit of the first word is a one (1).

15. A method of detecting an invalid branch instruction in a processor configured to execute atomic blocks comprising two or more instructions, the method comprising:
with the processor:
fetching and initiating execution of an instruction block;
generating a branch signal by executing an instruction of the instruction block indicating a target location;
based on the receiving the branch signal, verifying whether the target location is a valid branch target by:
checking that one or more bits stored at the target location match a specified bit pattern,
verifying that at least one field of the header conforms to an ISA specification for an instruction header, or
checking that one or more bits stored at the target location match a specified bit pattern and verifying that at least one field of the header conforms to the ISA specification for an instruction header; and
when the verifying indicates an instruction block header is not stored at the target location, initiating branch instruction exception processing.

16. The method of claim 15, wherein the branch signal includes a memory address of the target location.

17. The method of claim 15, wherein the verifying whether the target location is a valid branch target further comprises verifying that the target location is at a valid memory address for storing an instruction block.

18. The method of claim 15, wherein the branch signal is generated by executing a conditional branch instruction by one of the processing cores, and wherein the target location is indicated by a memory location relative to the conditional branch instruction.

19. The method of claim 15, wherein the fetching and initiating executing, the generating a branch signal, and the verifying the target location are performed using a processor as a field programmable gate array, an application-specific integrated circuit, or an integrated circuit.

20. The method of claim 15, wherein the checking that one or more bits stored at the target location match an architectural specification comprises verifying that the first bit at the target location is a one (1).

21. The method of claim 15, wherein the verifying whether the target location is a valid branch target comprises checking that one or more bits stored at the target location match a specified bit pattern but does not comprise verifying that at least one field of the header conforms to an ISA specification for an instruction header.

22. The method of claim 15, wherein the verifying whether the target location is a valid branch target comprises verifying that at least one field of the header conforms to an ISA specification for an instruction header but does not comprise checking that one or more bits stored at the target location match a specified bit pattern.

* * * * *